United States Patent
Shin et al.

(10) Patent No.: US 12,039,096 B2
(45) Date of Patent: Jul. 16, 2024

(54) GLASSES-TYPE WEARABLE DEVICE PROVIDING AUGMENTED REALITY GUIDE AND METHOD FOR CONTROLLING THE SAME

(71) Applicant: Samsung Electronics Co., Ltd., Suwon-si (KR)

(72) Inventors: Boosun Shin, Suwon-si (KR); Sungman Kim, Suwon-si (KR); Leebin Kim, Suwon-si (KR); Jieun Kim, Suwon-si (KR); Hyunjung Kim, Suwon-si (KR); Boram Lee, Suwon-si (KR); Jaemin Jung, Suwon-si (KR); Ahreum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 17/867,077

(22) Filed: Jul. 18, 2022

(65) Prior Publication Data

US 2023/0014774 A1 Jan. 19, 2023

Related U.S. Application Data

(63) Continuation of application No. PCT/KR2022/004448, filed on Mar. 29, 2022.

(30) Foreign Application Priority Data

Jul. 19, 2021 (KR) .................. 10-2021-0094398

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0101* (2013.01); *G02B 27/017* (2013.01);
(Continued)

(58) Field of Classification Search
CPC ... G02B 27/0101; G02B 27/017; G06F 3/011; G06T 19/006; G06T 19/20
See application file for complete search history.

(56) References Cited

U.S. PATENT DOCUMENTS

2015/0146007 A1 5/2015 Dusik et al.
2015/0156803 A1* 6/2015 Ballard ................. H04W 76/10
455/422.1
(Continued)

FOREIGN PATENT DOCUMENTS

JP 2016-218594 A 12/2016
KR 10-2017-0041905 A 4/2017
(Continued)

OTHER PUBLICATIONS

International Search Report with Written Opinion dated Jul. 7, 2022, issued in International Patent Application No. PCT/KR2022/004448.

*Primary Examiner* — Charles Tseng
(74) *Attorney, Agent, or Firm* — Jefferson IP Law, LLP

(57) ABSTRACT

A glasses-type wearable device providing an augmented reality guide and a method for controlling the same is provided. The glasses-type wearable device includes a communication circuit, a camera, and a processor configured to receive a second surrounding-image of an external electronic device connected with the glasses-type wearable device from the external electronic device through the communication module while obtaining a first surrounding-image of the glasses-type wearable device using the camera, identify a first task being performed by a user of the glasses-type wearable device using the first surrounding-
(Continued)

image and a second task being performed by a user of the external electronic device using the second surrounding-image, identify a difference between a current progress status of the first task and second task, and control the communication circuit to provide an AR guide corresponding to the second task to the external electronic device, based on the identified difference in progress status.

18 Claims, 29 Drawing Sheets

(51) Int. Cl.
  *G06T 19/00* (2011.01)
  *G06T 19/20* (2011.01)
(52) U.S. Cl.
  CPC ............ *G06T 19/006* (2013.01); *G06T 19/20* (2013.01); *G02B 2027/0138* (2013.01); *G02B 2027/014* (2013.01); *G02B 2027/0178* (2013.01); *G06T 2219/2021* (2013.01)

(56) References Cited

U.S. PATENT DOCUMENTS

| | | |
|---|---|---|
| 2016/0049004 A1 | 2/2016 | Mullins et al. |
| 2018/0203503 A1 | 7/2018 | Chehade et al. |
| 2019/0098227 A1 | 3/2019 | Park et al. |
| 2019/0279527 A1* | 9/2019 | Rohlfs ..................... G06T 7/20 |
| 2020/0379550 A1 | 12/2020 | Uhm et al. |
| 2021/0209364 A1 | 7/2021 | Park et al. |
| 2021/0407211 A1 | 12/2021 | Yi et al. |

FOREIGN PATENT DOCUMENTS

| | | |
|---|---|---|
| KR | 10-2019-0035116 A | 4/2019 |
| KR | 10-2004379 B1 | 7/2019 |
| KR | 10-2019-0117415 A | 10/2019 |
| KR | 10-2020-0109812 A | 9/2020 |
| KR | 10-2020-0138925 A | 12/2020 |

* cited by examiner

User B

1530  User B

GLASSES-TYPE WEARABLE DEVICE PROVIDING AUGMENTED REALITY GUIDE AND METHOD FOR CONTROLLING THE SAME

CROSS-REFERENCE TO RELATED APPLICATION(S)

This application is a continuation application, claiming priority under § 365(c), of an International application No. PCT/KR2022/004448, filed on Mar. 29, 2022, which is based on and claims the benefit of a Korean patent application number 10-2021-0094398, filed on Jul. 19, 2021, in the Korean Intellectual Property Office, the disclosure of which is incorporated by reference herein in its entirety.

TECHNICAL FIELD

The disclosure relates to a glasses-type wearable device providing an augmented reality guide and a method for controlling the same.

BACKGROUND ART

More and more services and additional features are being provided via electronic devices, e.g., glasses-type wearable devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

The above information is presented as background information only to assist with an understanding of the disclosure. No determination has been made, and no assertion is made, as to whether any of the above might be applicable as prior art with regard to the disclosure.

DISCLOSURE

Technical Problem

Recently, glasses-type wearable devices have been used for educational purposes. As an example of use of a glasses-type wearable device for educational purposes, a specific task being conducted by a first user wearing a glasses-type wearable device is represented, as a virtual object, on the real word that is viewed by a second user wearing a glasses-type wearable device. However, such a conventional way may be an educational one reflecting only the first user's point of view. In other words, if the first user is skillful at conducting the specific task, and the second user is not, the first user's speed of performing the task may differ from the second user's speed of performing the task. Even in such a case, if information about the task being current performed by the first user is provided so that the task being currently performed by the first user is represented as a virtual object to the second user, the goal of the education may not be achieved. Further, the conventional method does not provide the function or operation of using the task (e.g., education) being currently performed using other devices (e.g., a refrigerator and a smartphone) operably connected with the glasses-type wearable device.

Technical Solution

Aspects of the disclosure are to address at least the above-mentioned problems and/or disadvantages and to provide at least the advantages described below. Accordingly, an aspect of the disclosure is to provide a glasses-type wearable device capable of providing an augmented reality guide appropriate for a task progress status of a second user wearing a glasses-type wearable device by providing an augmented reality guide to the second user's glasses-type wearable device based on a difference in progress status between a first task (e.g., a task being currently performed by a first user) and the second task (e.g., a task being currently performed by the second user).

Another aspect of the disclosure is to provide a glasses-type wearable device capable of providing information about the position of an object necessary to perform a specific task using other devices (e.g., a refrigerator and a smartphone) operably connected with a glasses-type wearable device.

Additional aspects will be set forth in part in the description which follows and, in part, will be apparent from the description, or may be learned by practice of the presented embodiments.

In accordance with an aspect of the disclosure, a glasses-type wearable device is provided. The glasses-type wearable device includes a communication module, at least one camera, and at least one processor configured to receive a second surrounding image of an external electronic device operably connected with the glasses-type wearable device, obtained by the external electronic device, from the external electronic device through the communication module while obtaining a first surrounding image of the glasses-type wearable device using the at least one camera, identify a first task being performed by a user of the glasses-type wearable device using the first surrounding image and a second task being performed by a user of the external electronic device using the second surrounding image, identify a difference between a current progress status of the first task and a current progress status of the second task, and control the communication module to provide an augmented reality (AR) guide corresponding to the second task to the external electronic device, based on the identified difference in current progress status.

In accordance with another aspect of the disclosure, a glasses-type wearable device is provided. The glasses-type wearable device includes a communication module, at least one camera, and at least one processor configured to obtain a second surrounding image from a first external electronic device operably connected with the glasses-type wearable device while obtaining a first surrounding image of the glasses-type wearable device through the at least one camera, identify a first object selected by a user of the first external electronic device using the obtained second surrounding image, determine whether a second object corresponding to the identified first object is included in the first surrounding image, when the object corresponding to the identified first object is not included in the first surrounding image, determine whether the second object is included in a third surrounding image obtained by a second external electronic device operably connected with the glasses-type wearable device, and provide an augmented reality guide through the glasses-type wearable device based on a result of the determination.

In accordance with another aspect of the disclosure, a method for controlling a glasses-type wearable device is provided. The method includes receiving a second surrounding image of an external electronic device operably connected with the glasses-type wearable device, obtained by the external electronic device, from the external electronic device through a communication module of the glasses-type wearable device while obtaining a first surrounding image of the glasses-type wearable device using at least one camera of the glasses-type wearable device, identifying a first task being performed by a user of the glasses-type wearable device using the first surrounding image and a second task being performed by a user of the external electronic device using the second surrounding image, identifying a difference between a current progress status of the first task and a current progress status of the second task, and controlling the communication module to provide an augmented reality (AR) guide corresponding to the second task to the external electronic device, based on the identified difference in current progress status.

Advantageous Effects

According to an embodiment of the disclosure, there may be provided a glasses-type wearable device capable of providing an augmented reality guide appropriate for a task progress status of a second user wearing a glasses-type wearable device by providing an augmented reality guide to the second user's glasses-type wearable device based on a difference in progress status between a first task (e.g., a task being currently performed by a first user) and the second task (e.g., a task being currently performed by the second user).

According to an embodiment of the disclosure, there may be provided a glasses-type wearable device capable of providing information about the position of an object necessary to perform a specific task using other devices (e.g., a refrigerator and a smartphone) operably connected with a glasses-type wearable device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
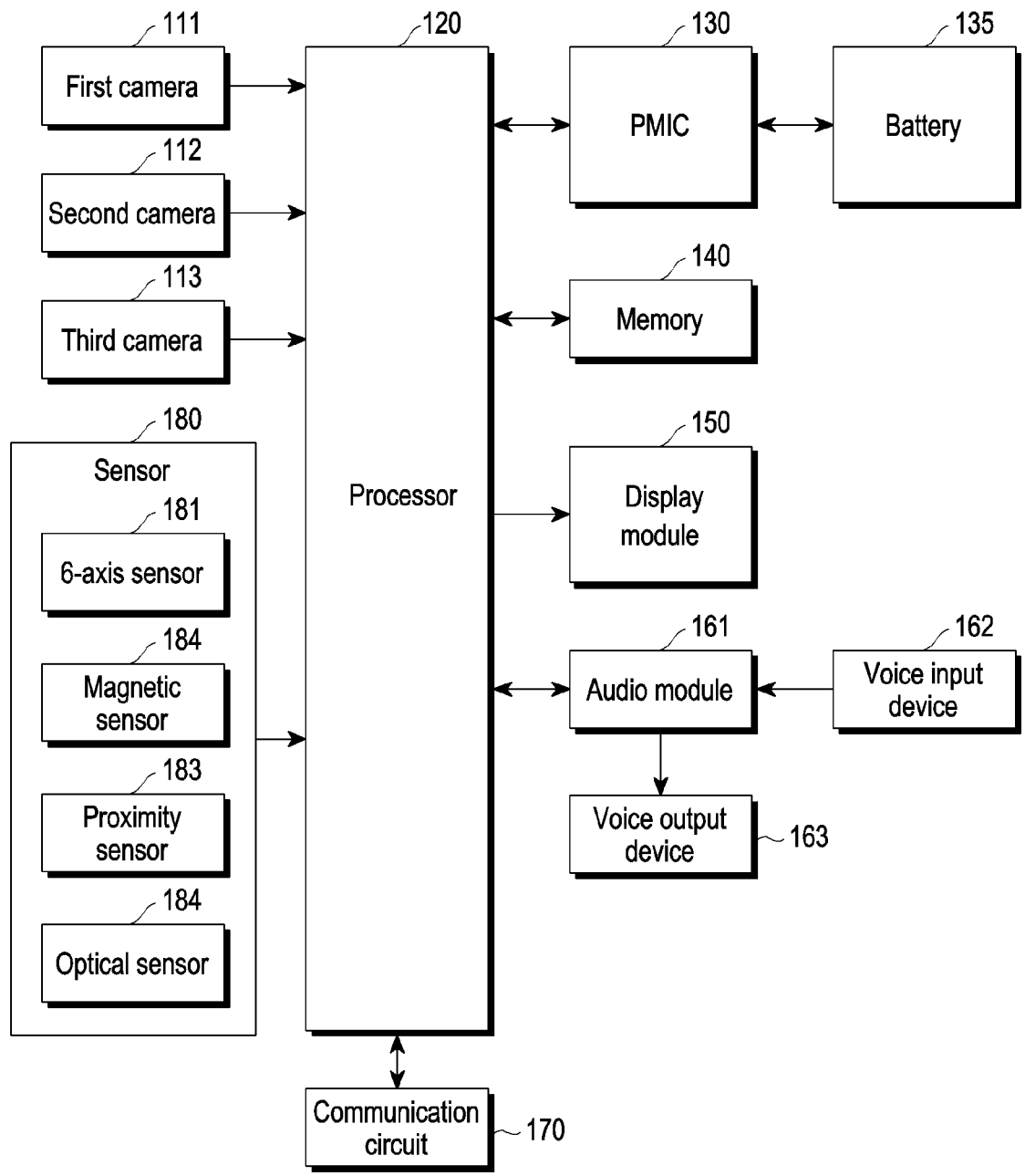
FIG. 1 is an example view illustrating a glasses-type wearable device according to an embodiment of the disclosure.

FIG. 1 is an example view illustrating a glasses-type wearable device or according to an embodiment of the disclosure. Although a glasses-type wearable device 100 or 310 is described herein as an example, the disclosure is not limited thereto. For example, various embodiments of the disclosure may be applied to at least one of an accessory-type device (e.g., a watch, a ring, a bracelet, an anklet, a necklace, glasses, contact lenses, or a head-mounted device (HMD) or head-mounted display (HMD)), a fabric- or clothes-integrated device (e.g., electronic clothes), a body attaching-type device (e.g., a skin pad or tattoo), or a body implantable device.

Referring to FIG. 1, the glasses-type wearable device 100 or 310 may include at least one of a first camera 111, a second camera 112, a third camera 113, a processor 120, a power management integrated circuit (PMIC) 130, a battery 135, a memory 140, a display module 150, an audio module 161, a voice input device 162, a voice output device 163, a communication circuit 170, and a sensor 180.

According to an embodiment of the disclosure, an image obtained through the first camera 111 may be used for detection of the user's hand gesture, tracking the user's head, and/or spatial recognition. According to an embodiment of the disclosure, the first camera 111 may include a global shutter (GS) camera. According to an embodiment of the disclosure, the first camera 111 may perform a simultaneous localization and mapping (SLAM) operation through depth capture. According to an embodiment of the disclosure, the first camera 111 may perform spatial recognition for six-degrees of freedom (6DoF). According to an embodiment of the disclosure, the first camera 111 may be configured to capture the real world corresponding to the first user's gaze when worn by the first user. The glasses-type wearable device 100 according to an embodiment herein may identify, through for example a proximity sensor included in the glasses-type wearable device 100, whether the user is wearing the glasses-type wearable device 100. Alternatively, the glasses-type wearable device 100 according to an embodiment herein may identify, through an angle sensor provided at a hinge part of the glasses-type wearable device 100, whether a frame of the glasses-type wearable device 100 is unfolded (e.g., an unfolded state), and when the approach of the user is sensed while the frame of the glasses-type wearable device 100 is unfolded, may determine that the glasses-type wearable device 100 is worn by the user.

According to an embodiment of the disclosure, the image obtained through the second camera 112 may be used to detect and track the user's eye. According to an embodiment of the disclosure, the second camera 112 may include a GS camera. According to an embodiment of the disclosure, second cameras 112 may correspond to the left and right eye, respectively, and may have the same or similar performances.

According to an embodiment of the disclosure, the third camera 113 may include a camera with a higher resolution than the first camera 111 and the second camera 112. According to an embodiment of the disclosure, the third camera 113 may perform auto-focusing (AF) and anti-shake functions. According to an embodiment of the disclosure, the third camera 113 may include a GS camera or a rolling shutter (RS) camera. According to an embodiment of the disclosure, the first camera 111 may be configured to capture the real world corresponding to the first user's gaze when worn by the first user.

According to an embodiment of the disclosure, the processor 120 may control the other components of the glasses-type wearable device 100 or 310, e.g., the first camera 111, the second camera 112, the third camera 113, the PMIC 130, the memory 140, the display module 150, the audio module 161, the communication circuit 170, and the sensor 180 and may perform various data processing or computations. According to an embodiment of the disclosure, the processor 120 may execute, for example, software (e.g., a program) to control at least one other component (e.g., a hardware or software component) of the glasses-type wearable device 100 or 310 coupled with the processor 120, and may perform various data processing or computation. According to one embodiment of the disclosure, as at least part of the data processing or computation, the processor 120 may store a command or data received from another component (e.g., the sensor module 176 or communication circuit 170 or a sensor module 190) onto a volatile memory, process the command or the data stored in the volatile memory, and store resulting data in a non-volatile memory. According to an embodiment of the disclosure, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor 121. For example, when the glasses-type wearable device 100 or 310 includes the main processor and the auxiliary processor, the auxiliary processor may be configured to use lower power than the main processor or to be specified for a designated function. The auxiliary processor may be implemented as separate from, or as part of the main processor.

According to an embodiment of the disclosure, the PMIC 130 may convert the power stored in the battery 135 to have the current or voltage required by the other components of the glasses-type wearable device 100 or 310 and supply it to the other components of the glasses-type wearable device 100 or 310.

According to an embodiment of the disclosure, the memory 140 may store various data used by at least one component (e.g., the processor 120 or the sensor 180) of the glasses-type wearable device 100 or 310. According to an embodiment of the disclosure, the memory 140 may include a volatile or non-volatile memory.

According to an embodiment of the disclosure, the display module 150 may display a screen to be provided to the user. According to an embodiment of the disclosure, the display module 150 may output data (e.g., red green blue (RGB) data) for representing a virtual object (e.g., augmented reality guide). According to an embodiment of the disclosure, the display module 150 may include a first display 251, a second display 252, one or more input optical members 253-1 and 253-2, one or more transparent members 290-1 and 290-2, and one or more screen display portions 254-1 and 254-2.

According to an embodiment of the disclosure, the audio module 161 may be connected to the voice input device 162 and the voice output device 163 and may convert the data input through the voice input device 162 and may convert data to be output to the voice output device 163. According to an embodiment of the disclosure, the voice input device 162 may include at least one microphone, and that the voice output device 163 may include at least one speaker and an amplifier. According to an embodiment of the disclosure, the communication circuit 170 may support establishment of a wireless communication channel with an external electronic device connected with the glasses-type wearable device 100 or 310 and performing communication through the established communication channel. According to an embodiment of the disclosure, the sensor 180 may include a 6-axis sensor 181, a magnetic sensor 182, a proximity sensor 183, and/or an optical sensor 184.

Figure 2:
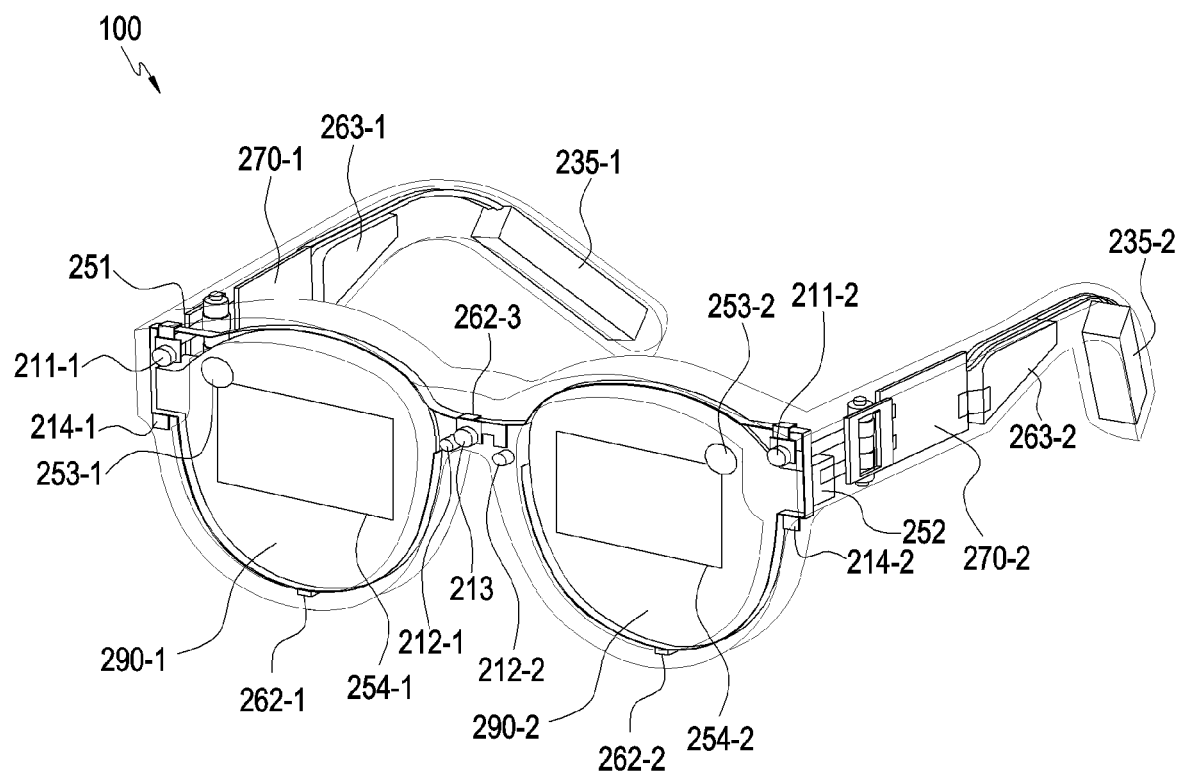
FIG. 2 is an example view illustrating a structure of a glasses-type wearable device according to an embodiment of the disclosure.

FIG. 2 is an example view illustrating a structure of a glasses-type wearable device 100 or 310 according to an embodiment of the disclosure.

Referring to FIG. 2, the glasses-type wearable device 100 or 310 may include one or more light emitting devices 214-1 and 214-2. According to an embodiment of the disclosure, the light emitting devices 214-1 and 214-2 may be different from a light source, which is described below, for irradiating light to a screen output area of the display. According to an embodiment of the disclosure, the light emitting devices 214-1 and 214-2 may radiate light for facilitating eye detection in detecting and tracking the user's eye through one or more second cameras 212-1 and 212-2. According to an embodiment of the disclosure, each of the light emitting devices 214-1 and 214-2 may include a light emitting diode (LED). According to an embodiment of the disclosure, the light emitting devices 214-1 and 214-2 may irradiate light in an infrared band. According to an embodiment of the disclosure, the light emitting devices 214-1 and 214-2 may be attached around the frame of the glasses-type wearable device 100 or 310. According to an embodiment of the disclosure, the light emitting devices 214-1 and 214-2 may be positioned around the first cameras 211-1 and 211-2 and, when the glasses-type wearable device 100 or 310 is used in a dark environment, assist gesture detection, head tracking, and space recognition by one or more first cameras 211-1 and 211-2. According to an embodiment of the disclosure, the light emitting devices 214-1 and 214-2 may be positioned around the one or more third cameras 213 and may assist obtaining images by the one or more third cameras 213 when the glasses-type wearable device 100 or 310 is used in a dark environment.

According to an embodiment of the disclosure, the glasses-type wearable device 100 or 310 may include batteries 235-1 and 235-2. The batteries 235-1 and 235-2 may store power for operating the remaining components of the glasses-type wearable device 100 or 310.

According to an embodiment of the disclosure, the glasses-type wearable device 100 or 310 may include a first display 251, a second display 252, one or more input optical members 253-1 and 253-2, one or more transparent members 290-1 and 290-2, and one or more screen display portions 254-1 and 254-2. According to an embodiment of the disclosure, the first display 251 and the second display 252 may include, e.g., a liquid crystal display (LCD), a digital mirror device (DMD), a liquid crystal on silicon (LCoS), or an organic light emitting diode (OLED), or a micro light emitting diode (micro LED). According to an embodiment of the disclosure, when the first display 251 and the second display 252 are formed of one of a liquid crystal display device, a digital mirror display device, or a silicon liquid crystal display device, the glasses-type wearable device 100 or 310 may include a light source for irradiating light to a screen output area of the display. According to an embodiment of the disclosure, when the first display 251 and the second display 252 may generate light on their own, e.g., when formed of either organic light emitting diodes or micro LEDs, the glasses-type wearable device 100 or 310 may provide a virtual image of relatively good quality to the user even when a separate light source is not included.

According to an embodiment of the disclosure, the one or more transparent members 290-1 and 290-2 may be disposed to face the user's eyes when the user wears the glasses-type wearable device 100 or 310. According to an embodiment of the disclosure, the one or more transparent members 290-1 and 290-2 may include at least one of a glass plate, a plastic plate, and a polymer. According to an embodiment of the disclosure, the user may view the outside world through the one or more transparent members 290-1 and 290-2 when the user wears the glasses-type wearable device 100 or 310. According to an embodiment of the disclosure, the one or more input optical members 253-1 and 253-2 may guide the light generated by the first display 251 and the second display 252 to the user's eyes. According to an embodiment of the disclosure, images may be formed on one or more screen display portions 254-1 and 254-2 on one or more transparent members 290-1 and 290-2, based on the light generated from the first display 251 and the second display 252, and the user may see the images formed on the one or more screen display portions 254-1 and 254-2.

According to an embodiment of the disclosure, the glasses-type wearable device 100 or 310 may include one or more optical waveguides (not shown). According to an embodiment of the disclosure, the optical waveguides may transfer the light generated by the first display 251 and the second display 252 to the user's eyes. The glasses-type wearable device 100 or 310 may include one optical waveguide corresponding to each of the left eye and the right eye. According to an embodiment of the disclosure, the optical waveguide may include at least one of glass, plastic, or polymer. According to an embodiment of the disclosure, the optical waveguide may include a nano-pattern formed inside or on one outer surface, e.g., a polygonal or curved grating structure. According to an embodiment of the disclosure, the optical waveguide may include a free-form type prism, and in this case, the optical waveguide may provide incident light to the user through a reflective mirror. According to an embodiment of the disclosure, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to an embodiment of the disclosure, the diffractive element may include input/output optical elements. According to an embodiment of the disclosure, the reflective element may include a member causing total reflection.

According to an embodiment of the disclosure, the glasses-type wearable device 100 or 310 may include one or more voice input devices 262-1, 262-2, and 262-3 and one or more voice output devices 263-1 and 263-2.

According to an embodiment of the disclosure, the glasses-type wearable device 100 or 310 may include a first PCB 270-1 and a second PCB 270-2. The first PCB 270-1 and the second PCB 270-2 may be configured to transfer electrical signals to components included in the glasses-type wearable device 100 or 310, such as a first camera 111, a second camera 112, a third camera 113, a display module 150, an audio module 161, and a sensor 180. According to an embodiment of the disclosure, the first PCB 270-1 and the second PCB 270-2 may include a flexible printed circuit board (FPCB). According to an embodiment of the disclosure, the first PCB 270-1 and the second PCB 270-2 each may include a first substrate, a second substrate, and an interposer disposed between the first substrate and the second substrate.

Figure 3A:
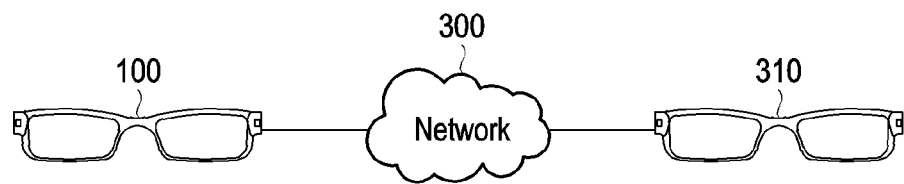
FIGS. 3A, 3B, and 3C are example views illustrating a connection relationship of a glasses-type wearable device according to various embodiments of the disclosure.
Figure 3B:
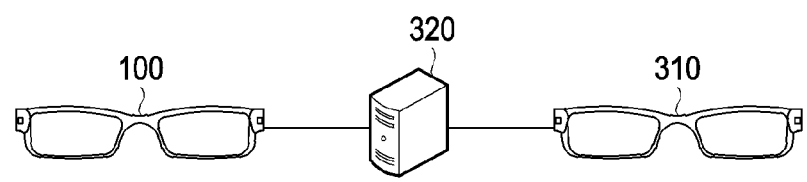
Figure 3C:
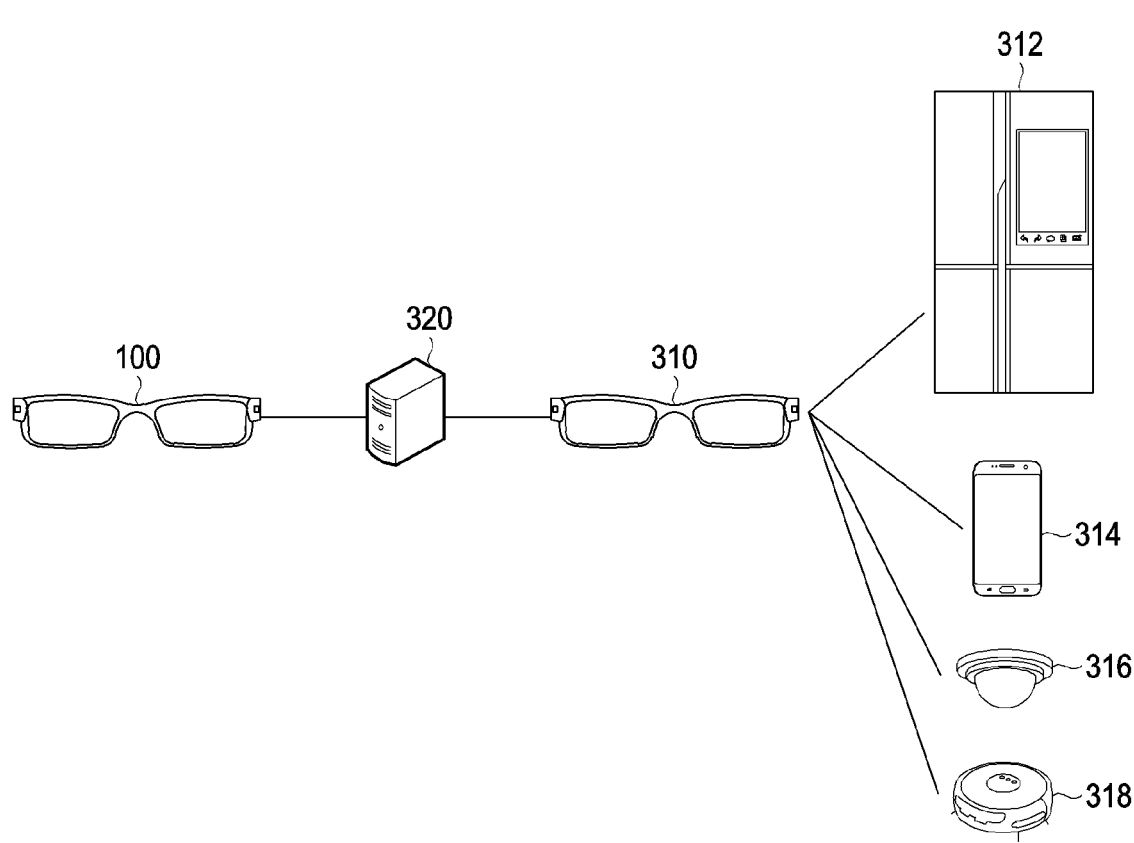

FIGS. 3A to 3C are example views illustrating a connection relationship of a glasses-type wearable device according to various embodiments of the disclosure.

Referring to FIG. 3A, according to an embodiment of the disclosure, a first user's glasses-type wearable device 100 may be directly connected with a second user's glasses-type wearable device 310 through a network 300. According to an embodiment of the disclosure, the network 300 may include a first network (e.g., a short-range communication network, such as Bluetooth™, wireless-fidelity (Wi-Fi) direct, or infrared data association (IrDA)) or a second network (e.g., a long-range communication network, such as a legacy cellular network, a $5^{th}$ generation (5G) network, a next-generation communication network, the Internet, or a computer network (e.g., local area network (LAN) or wide area network (WAN)).

Alternatively, referring to FIG. 3B, according to an embodiment of the disclosure, the first user's glasses-type wearable device 100 may be connected with the second user's glasses-type wearable device 310 through a server 320. According to an embodiment of the disclosure, the server 320 may include an intelligent server using machine learning and/or a neural network.

Referring to FIG. 3C, according to an embodiment of the disclosure, the first user's glasses-type wearable device 100 and/or the second user's glasses-type wearable device 310 may be connected to operate with a peripheral device (e.g., an IoT device). According to an embodiment of the disclosure, the peripheral device may include, e.g., a refrigerator 312, a smartphone 314, a closed-circuit television (CCTV) 316, and/or a robot cleaner 318.

Figure 4:
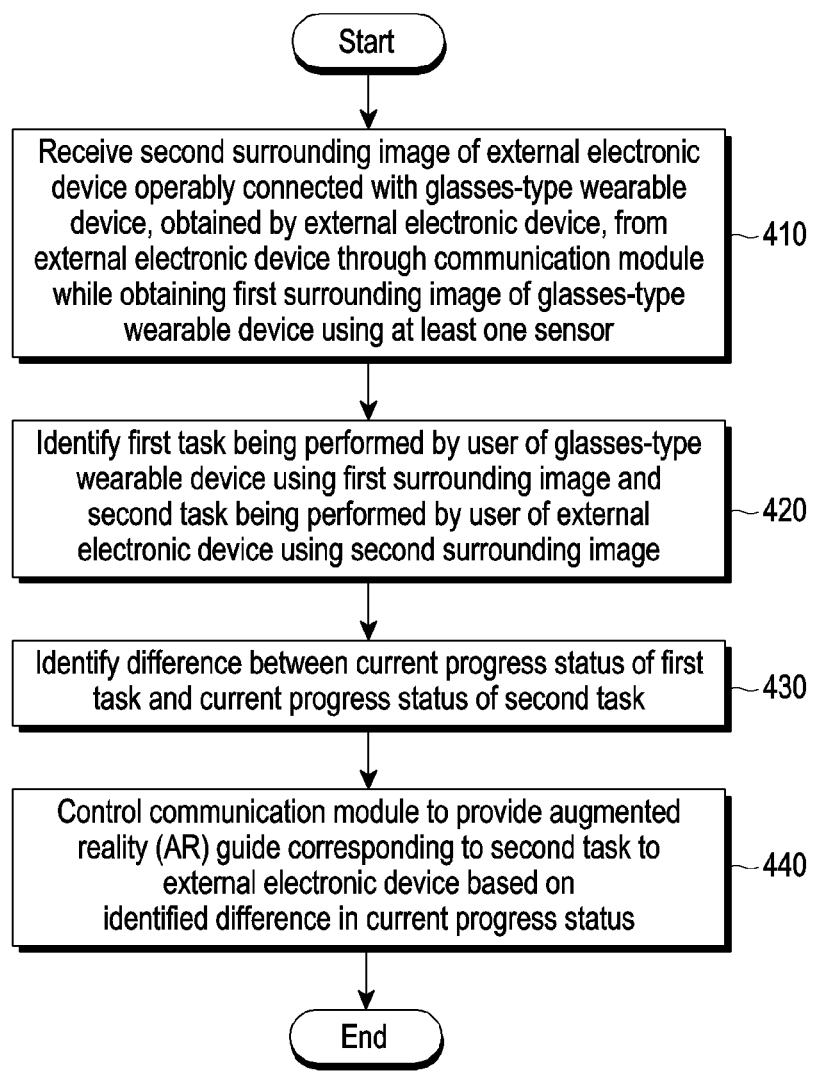
FIG. 4 is an example view illustrating a function or operation of controlling a communication module to provide an augmented reality guide corresponding to a second task based on a difference in current progress status between a first task and the second task by a first user's glasses-type wearable device according to an embodiment of the disclosure.

FIG. 4 is an example view illustrating a function or operation of controlling a communication module to provide an augmented reality guide corresponding to a second task based on a difference in current progress status between a first task and the second task by a first user's glasses-type wearable device according to an embodiment of the disclosure.

Figure 5A:
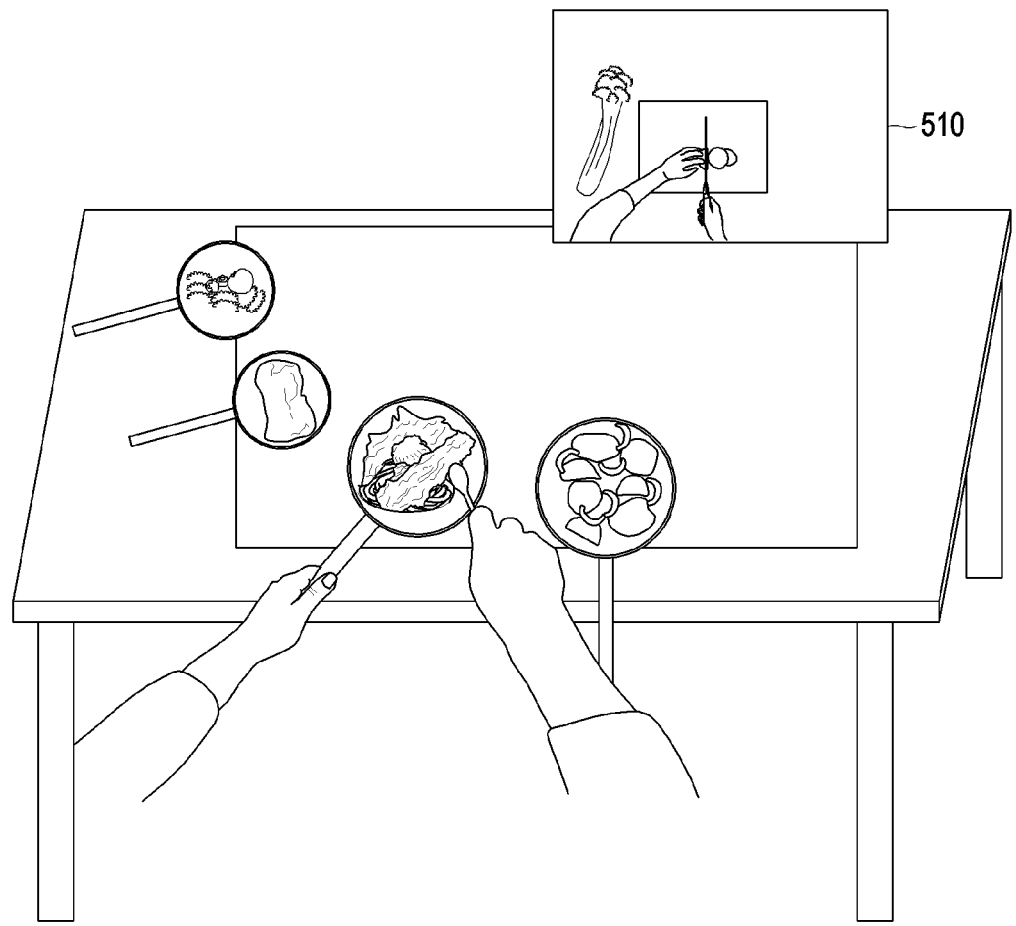
FIG. 5A is an example view illustrating a function or operation in which a second user's task progress context is represented as a virtual object through a first user's glasses-type wearable device on the first user's real world according to an embodiment of the disclosure.

FIG. 5A is an example view illustrating a function or operation in which a second user's task progress context is represented as a virtual object 510 through a first user's glasses-type wearable device 100 on the first user's real world according to an embodiment of the disclosure.

Figure 5B:
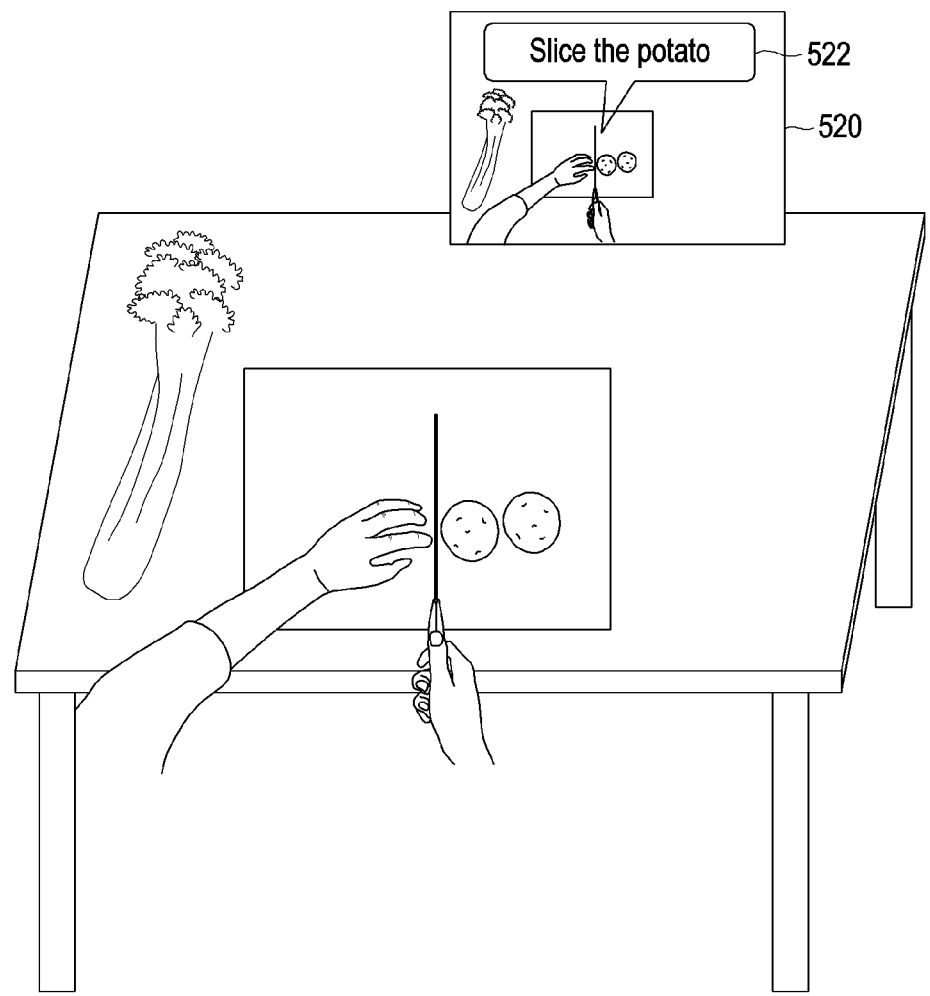
FIG. 5B is an example view illustrating a function or operation in which an augmented reality guide is represented as a video through a second user's glasses-type wearable device according to an embodiment of the disclosure.

FIG. 5B is an example view illustrating a function or operation in which an augmented reality guide 520 is represented as a video through a second user's glasses-type wearable device 310 according to an embodiment of the disclosure.

Figure 5C:
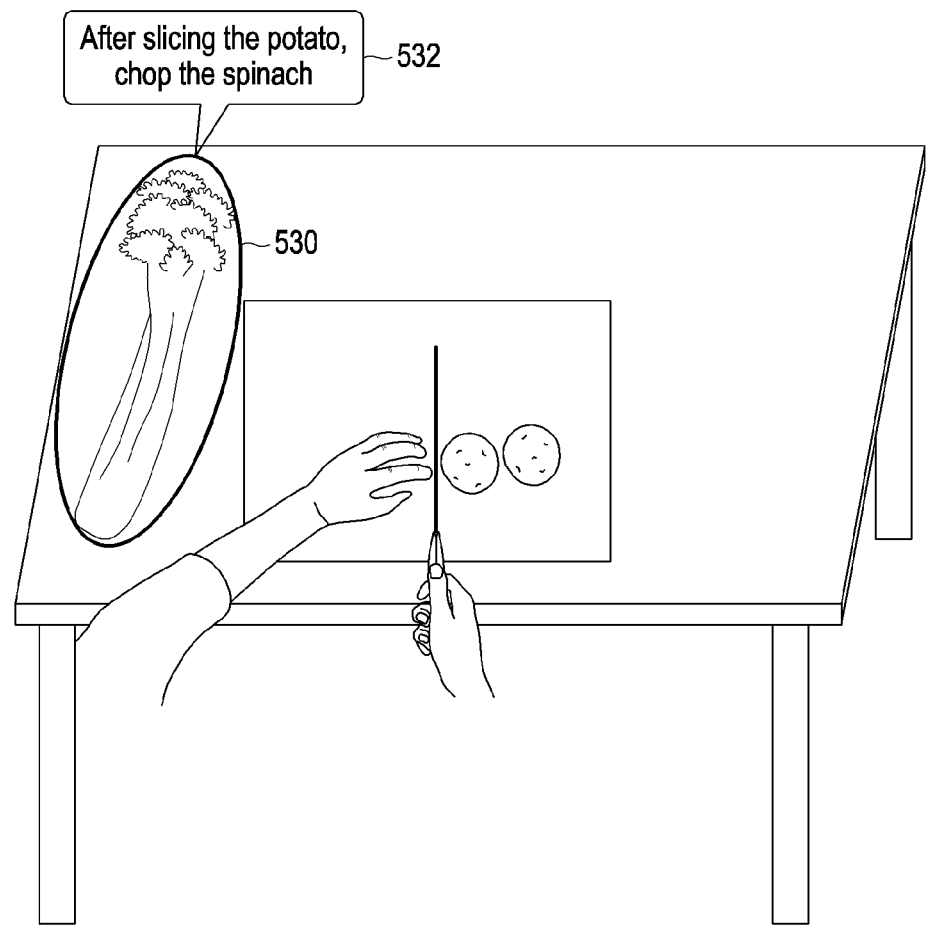
FIG. 5C is an example view illustrating a function or operation in which an augmented reality guide is represented as a static visual element according to an embodiment of the disclosure.

FIG. 5C is an example view illustrating a function or operation in which an augmented reality guide 520 is represented as a static visual element according to an embodiment of the disclosure. In the disclosure, "first user" may be used to mean a trainer who trains the second user, and "second user" may be used to mean a trainee who is trained by the first user.

Referring to FIG. 4, according to an embodiment of the disclosure, in operation 410, a glasses-type wearable device 100 (e.g., the first user's glasses-type wearable device) may receive a second surrounding image of an external electronic device obtained by the external electronic device through a communication module (e.g., the communication circuit 170) from the external electronic device (e.g., the second user's glasses-type wearable device 310) connected to operate with the glasses-type wearable device 100 while obtaining a first surrounding image of the glasses-type wearable device 100 using at least one sensor (e.g., the first camera 111 or the third camera 113).

Referring to FIG. 5A, according to an embodiment of the disclosure, the glasses-type wearable device 100 (e.g., the processor 120) may represent the obtained second surrounding image, as a virtual object 510, when the second surrounding image is obtained. To that end, according to an embodiment of the disclosure, the glasses-type wearable device 100 (e.g., the processor 120) may control the display module 150 to output data for the second surrounding image to represent the second surrounding image as the virtual object 510. FIG. 5A illustrates an example in which "cooking" is performed as an operation. FIG. 5A also illustrates an example in which as tasks constituting the operation, a first user performs the task of frying potato sliced by the first user, and a second user performs the task of slicing a potato. Although FIG. 5A illustrates that the virtual object 510 is represented on a 2D plane for convenience of description, this is merely an example, and the virtual object 510 may be represented as a 3D object. Further, the virtual object 510 and the augmented reality guide 520 may be disposed on the front or side surface of the field of view.

According to an embodiment of the disclosure, in operation 420, the glasses-type wearable device 100 (e.g., the first user's glasses-type wearable device) may identify the first task being performed by the user of the glasses-type wearable device 100 using a first surrounding image and identify the second task being performed by the user of the external electronic device (e.g., the second user's glasses-type wearable device 310) using the second surrounding image. According to an embodiment of the disclosure, the first surrounding image and/or the second surrounding image may be an image that is captured by the external electronic device operably connected with the glasses-type wearable device 100 according to an embodiment of the disclosure and transmitted to the glasses-type wearable device 100. According to another embodiment of the disclosure, the glasses-type wearable device 100 according to an embodiment of the disclosure may be configured to receive information about the current progress status of the second user (e.g., "second user currently performing task 4") rather than receiving the second surrounding image from the second user's glasses-type wearable device 310. According to another embodiment of the disclosure, operation 420 may also be performed by the external electronic device operably connected with the glasses-type wearable device 100 according to an embodiment of the disclosure (e.g., through tethering). According to an embodiment of the disclosure, the glasses-type wearable device 100 (e.g., the processor 120) may identify which task each user is currently performing by comparing a reference image stored in the glasses-type wearable device 100 (e.g., the memory 140) and each of the first surrounding image and second surrounding image. For example, when the reference image showing that potato is sliced and the second surrounding image correspond to each other (e.g., when a result of analysis of motion in the image is quantitatively included in an error range), the glasses-type wearable device 100 may determine that the second user is current slicing potato. The function or operation of identifying the task may be learned by an artificial intelligence model. Such learning may be performed, e.g., by the glasses-type wearable device 100 itself or through a separate server (e.g., the server 320). Learning algorithms may include, but are not limited to, e.g., supervised learning, unsupervised learning, semi-supervised learning, or reinforcement learning. The artificial intelligence model may include a plurality of artificial neural network layers. According to an embodiment of the disclosure, the artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure. According to an embodiment of the disclosure, the reference image may be separately stored for each of at least one task constituting one operation. Further, it may be stored in the glasses-type wearable device 100 (e.g., the memory 140) separately for each of at least one task according to an embodiment of the disclosure. For example, when the first user performs one operation of pouring water to a pot (task 1), placing it on induction cooktop (task 2), washing a potato (task 3), slicing the potato (task 4), and frying the sliced potato (task 5)," information (e.g., the obtained image) about each task may be stored according to the order of elapsed times, separately for each task of the operation. For example, when an image in which the user washes the potato (e.g., when task 3 is identified), images for task 1 and task 2 may be stored together with time information in the glasses-type wearable device 100 (e.g., the memory 140). According to an embodiment of the disclosure, a reference as to how to distinguish the tasks may have been previously determined. For example, when the operation is "cooking," the task of pouring water into a pot followed by placing it on induction cooktop by the user may be pre-designated to be designated as one task and stored. The function or operation of distinguishing the task may be learned by an artificial intelligence model. Such learning may be performed, e.g., by the glasses-type wearable device 100 itself or through a separate server (e.g., the server 320). According to an embodiment of the disclosure, the function or operation in which the first user's operation is stored in the glasses-type wearable device 100 (e.g., the memory 140) separately for each of at least one task may be performed simultaneously with or after operation 420. According to an embodiment of the disclosure, operation 420 may be performed according to a predesignated time period or the user's request.

According to an embodiment of the disclosure, in operation 430, the glasses-type wearable device may identify a difference between the current progress status of the first task and the current progress status of the second task. According to an embodiment of the disclosure, e.g., when it is determined that user 1 is currently frying the sliced potato (e.g., when it is determined that task 5 is being performed), and user 2 is slicing the potato (e.g., when it is determined that task 4 is being performed), the glasses-type wearable device 100 (e.g., the processor 120) may determine that the difference between the users' tasks is 1. In other words, it may be determined that user 1 is performing the task faster than user 2. According to an embodiment of the disclosure, when it is determined that there is no difference between user 1's task performing state and user 2's task performing task (e.g., when it is determined that they both are slicing potatoes), the glasses-type wearable device 100 (e.g., the processor 120) may determine that there is no difference.

According to an embodiment of the disclosure, in operation 440, the glasses-type wearable device 100 may control the communication module (e.g., the communication circuit 170) to provide an augmented reality guide 520 corresponding to the second task to an external electronic device (e.g., the second user's glasses-type wearable device 310) based on the difference between the current progress status of the first task and the current progress status of the second task. According to an embodiment of the disclosure, the glasses-type wearable device 100 (e.g., the processor 120) may control the communication module (e.g., the communication circuit 170) to provide the guide image for task 4 (e.g., the task being currently performed by user 2) stored in the glasses-type wearable device 100 (e.g., the memory 140) to the external electronic device (e.g., the second user's glasses-type wearable device 310). According to an embodiment of the disclosure, the guide image may include the image of performing task 4 by the first user or a pilot image (e.g., a test image) for task 4 captured by a camera (e.g., the first camera 111 and/or the third camera 113).

Referring to FIG. 5B, according to an embodiment of the disclosure, the augmented reality guide 520 may be represented as a virtual object through the external electronic device. According to an embodiment of the disclosure, the augmented reality guide 520 may include a first guide message 522, the first guide message 522 related to a specific task. According to an embodiment of the disclosure, the first guide message 522 may include a message corresponding to the voice uttered while the first user performs the specific task or a text message included in the pilot image. According to an embodiment of the disclosure, the image may include a video.

Referring to FIG. 5C, according to an embodiment of the disclosure, the augmented reality guide 520 may also be represented as a static visual element 530, rather than a video, and/or a second guide message 532. For example, the external electronic device (e.g., the second user's glasses-type wearable device 310) may receive a command for representing the static visual element 530 and/or the second guide message 532 from the first user's glasses-type wearable device 100. When receiving a command for representing the static visual element 530 and/or the second guide message 532 from the first user's glasses-type wearable device 100, the external electronic device (e.g., the second user's glasses-type wearable device 310) may represent the static visual element 530 and/or the second guide message 532 as a virtual object. For example, when receiving a command for representing the static visual element 530 and/or the second guide message 532 for spinach, the external electronic device may identify the spinach from the obtained surrounding image and then represent the static visual element 530 and/or the second guide message 532, as a virtual object, around the spinach. According to an embodiment of the disclosure, the function or operation of providing the static visual element 530 may mean, e.g., the function or operation of providing a visual element having a specific color or shape around a specific object in an augmented reality manner to allow the specific object to be distinguished from another object. According to an embodiment of the disclosure, the external electronic device may distinguish the specific object (e.g., spinach) from the surrounding image based on the reference image stored in the memory of the external electronic device. Alternatively, according to an embodiment of the disclosure, the function or operation of distinguishing the specific object may be performed by a learning algorithm or artificial intelligence model. To transmit the command to the external electronic device, the glasses-type wearable device 100 according to an embodiment of the disclosure may store an image for a specific task along with a description for the image (e.g., "image for slicing potato followed by chopping spinach"). According to an embodiment of the disclosure, the description may automatically be generated by the processor 120 based on voice data (e.g., the user's utterance) and image data (e.g., an image of the user chopping spinach) included in the image. According to an embodiment of the disclosure, the glasses-type wearable device (e.g., the processor 120) may generate a command based on the description for the image and transmit it to the external electronic device.

Figure 6:
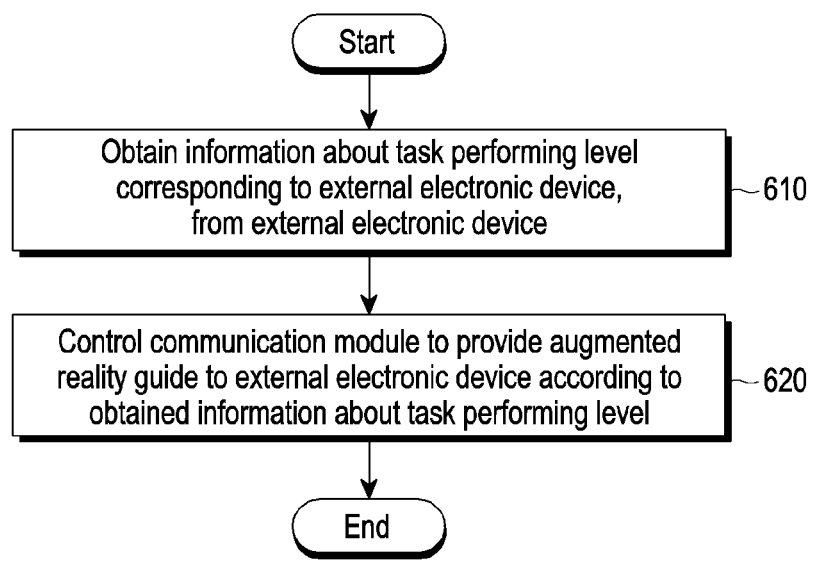
FIG. 6 is an example view illustrating a function or operation of providing different augmented reality guides depending on a second user's task performing levels according to an embodiment of the disclosure.

FIG. 6 is an example view illustrating a function or operation of providing different augmented reality guides depending on a second user's task performing levels according to an embodiment of the disclosure.

Figure 7A:
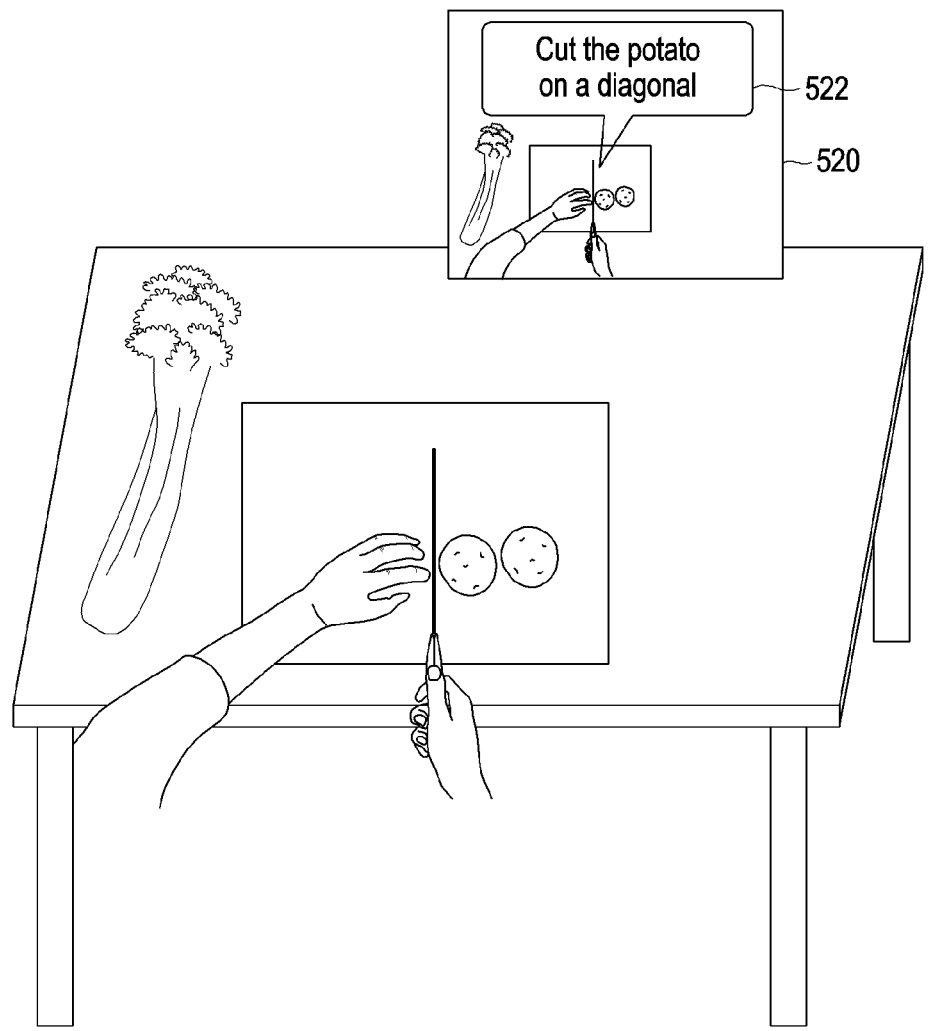
FIG. 7A is an example view illustrating an augmented reality guide provided to a second user's glasses-type wearable device when a second user's task performing level is relatively high according to an embodiment of the disclosure.

FIG. 7A is an example view illustrating an augmented reality guide provided to a second user's glasses-type wearable device when a second user's task performing level is relatively high according to an embodiment of the disclosure.

Figure 7B:
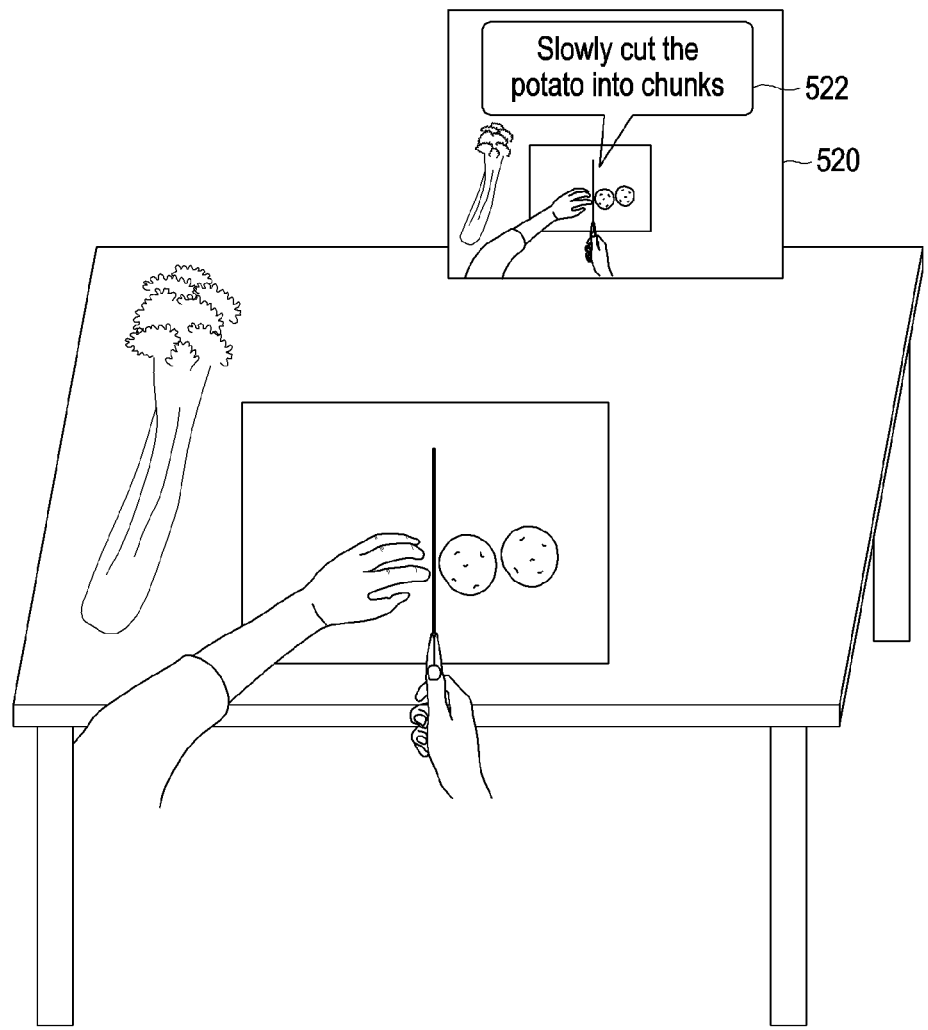
FIG. 7B is an example view illustrating an augmented reality guide provided to a second user's glasses-type wearable device when a second user's task performing level is relatively low according to an embodiment of the disclosure.

FIG. 7B is an example view illustrating an augmented reality guide provided to a second user's glasses-type wearable device when a second user's task performing level is relatively low according to an embodiment of the disclosure.

Referring to FIG. 6, according to an embodiment of the disclosure, in operation 610, the glasses-type wearable device 100 may obtain information about a task performing level (e.g., the second user's task performing level) corresponding to an external electronic device (e.g., the second user's glasses-type wearable device 310) from the external electronic device. According to an embodiment of the disclosure the glasses-type wearable device 100 may receive, from the external electronic device, information about any one level selected from among three levels, "beginner," "intermediate," and "advanced."

According to an embodiment of the disclosure, in operation 620, the glasses-type wearable device 100 may control the communication module (e.g., the communication circuit 170) to provide an augmented reality guide 520 to an external electronic device (e.g., the second user's glasses-type wearable device 310) according to the obtained information about the task performing level.

Referring to FIG. 7A, according to an embodiment of the disclosure, the glasses-type wearable device 100 may provide a pilot image corresponding to the second user's current task as the augmented reality guide 520. FIG. 7A illustrates an example in which the second user's task performing level is "advanced." In this case, among pilot images corresponding to the second user's current task, stored in the glasses-type wearable device (e.g., the memory 140) or an external memory (not shown) operably connected with the glasses-type wearable device 100, as the pilot image, the pilot image corresponding to the "advanced" level may be provided as the augmented reality guide 520. According to an embodiment of the disclosure, the pilot image of the advanced level may include a first guide message 522 related to a specific task, appropriate for the "advanced" level.

Referring to FIG. 7B, according to an embodiment of the disclosure, the glasses-type wearable device 100 may provide a pilot image corresponding to the second user's current task as the augmented reality guide 520. FIG. 7B illustrates an example in which the second user's task performing level is "beginner." In this case, among pilot images corresponding to the second user's current task, stored in the glasses-type wearable device (e.g., the memory 140) or an external memory (not shown) operably connected with the glasses-type wearable device 100, as the pilot image, the pilot image corresponding to the "beginner" level may be provided as the augmented reality guide 520. According to an embodiment of the disclosure, the pilot image of the beginner level may include a first guide message 522 related to a specific task, appropriate for the "beginner" level. According to an embodiment of the disclosure, the glasses-type wearable device 100 may control the display module 150 to provide, in an augmented reality manner, a guide message to allow the pilot image to be provided as the augmented reality guide 520 corresponding to a next task without performing the current task according to the difficulty (e.g., risk) of the task. To that end, according to an embodiment of the disclosure, the glasses-type wearable device 100 or at least one external electronic device connected to operate with the glasses-type wearable device 100 may perform the function or operation of determining the difficulty of the augmented reality guide 520 currently provided.

Figure 8:
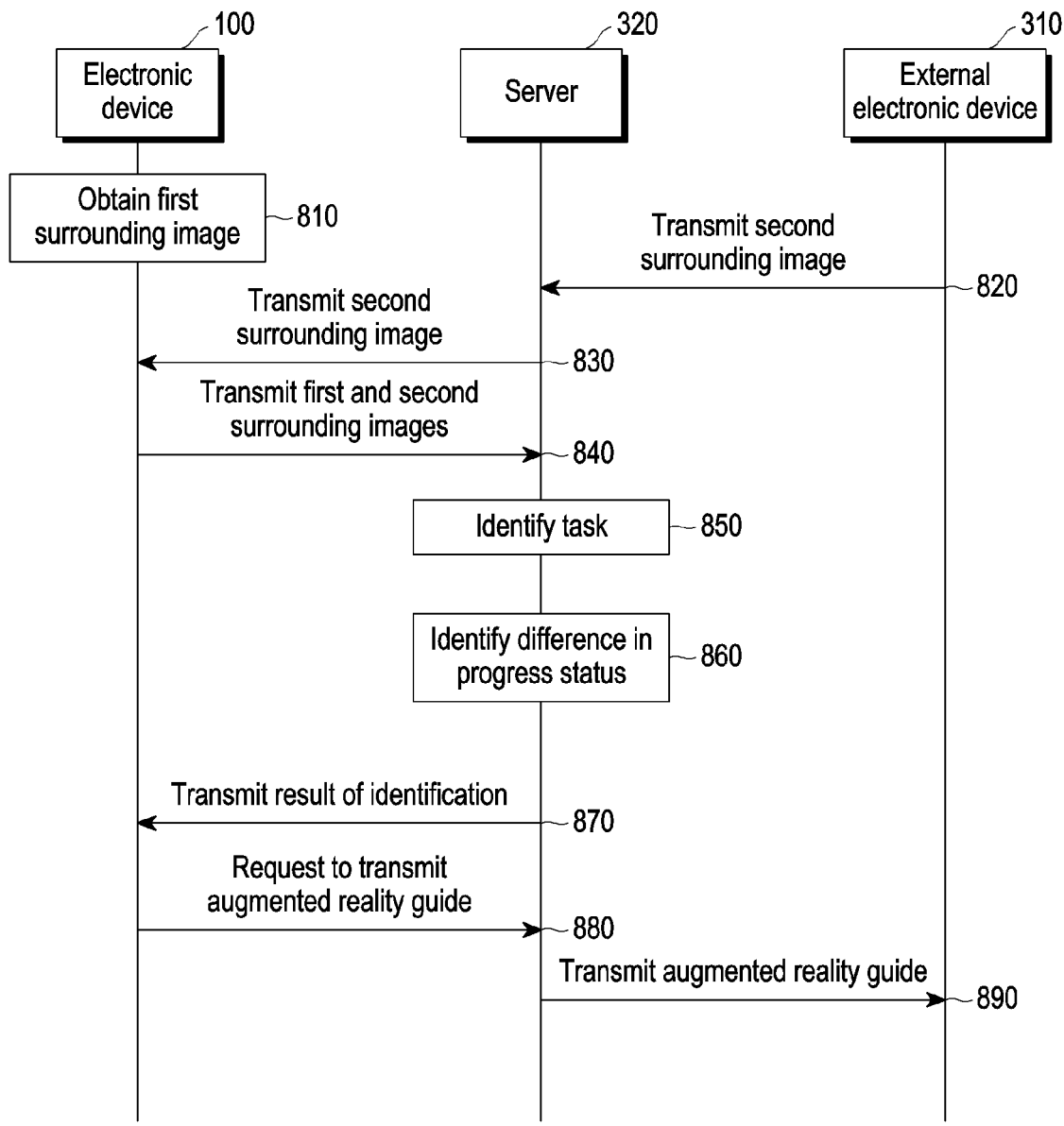
FIG. 8 is an example view illustrating a function or operation in which transmission of an augmented reality guide is performed by a server according to an embodiment of the disclosure.

FIG. 8 is an example view illustrating a function or operation in which transmission of an augmented reality guide is performed by a server according to an embodiment of the disclosure.

Referring to FIG. 8, according to an embodiment of the disclosure, in operation 810, the glasses-type wearable device 100 may obtain a first surrounding image. According to an embodiment of the disclosure, in operation 820, an external electronic device (e.g., the second user's glasses-type wearable device 310) may transmit a second surrounding image to the server 320. According to an embodiment of the disclosure, in operation 830, the server 320 may transmit the second surrounding image to the glasses-type wearable device 100. According to another embodiment of the disclosure, operation 830 may be omitted. According to an embodiment of the disclosure, in operation 840, the glasses-type wearable device 100 may transmit the first surrounding image and the second surrounding image to the server 320. However, according to another embodiment of the disclosure, the operation of transmitting the second surrounding image to the server 320 by the glasses-type wearable device 100 may be omitted. According to an embodiment of the disclosure, in operation 850, the server 320 may identify the task. According to an embodiment of the disclosure, the server 320 may identify which task each user is currently performing by comparing a reference image stored in the server 320 (e.g., the memory 140) and each of the first surrounding image and second surrounding image. For example, when the reference image showing that the potato is sliced and the second surrounding image correspond to each other (e.g., when a result of analysis of motion in the image is quantitatively included in an error range), the server 320 may determine that the second user is current slicing potato. According to an embodiment of the disclosure, in operation 860, the server 320 may identify the difference in progress status. According to an embodiment of the disclosure, e.g., when it is determined that user 1 is currently frying the sliced potato (e.g., when it is determined that task 5 is being performed), and user 2 is slicing the potato (e.g., when it is determined that task 4 is being performed), the server 320 may determine that the difference between the users' tasks is 1. According to an embodiment of the disclosure, in operation 870, the server 320 may transmit the result of identification to the glasses-type wearable device 100. According to an embodiment of the disclosure, in operation 880, the glasses-type wearable device 100 may request the server 320 to transmit an augmented reality guide. According to an embodiment of the disclosure, the server 320 may transmit the augmented reality guide to the second user's glasses-type wearable device 310. However, according to an embodiment of the disclosure, operations 870 and 880 may be omitted, and operation 890 may be performed immediately after operation 860. According to an embodiment of the disclosure, the augmented reality guide 520 may be stored in the server 320. To that end, according to an embodiment of the disclosure, the server 320 may receive information about the image obtained by the glasses-type wearable device 100 from the glasses-type wearable device 100, in real-time or at a specific time.

Figure 9:
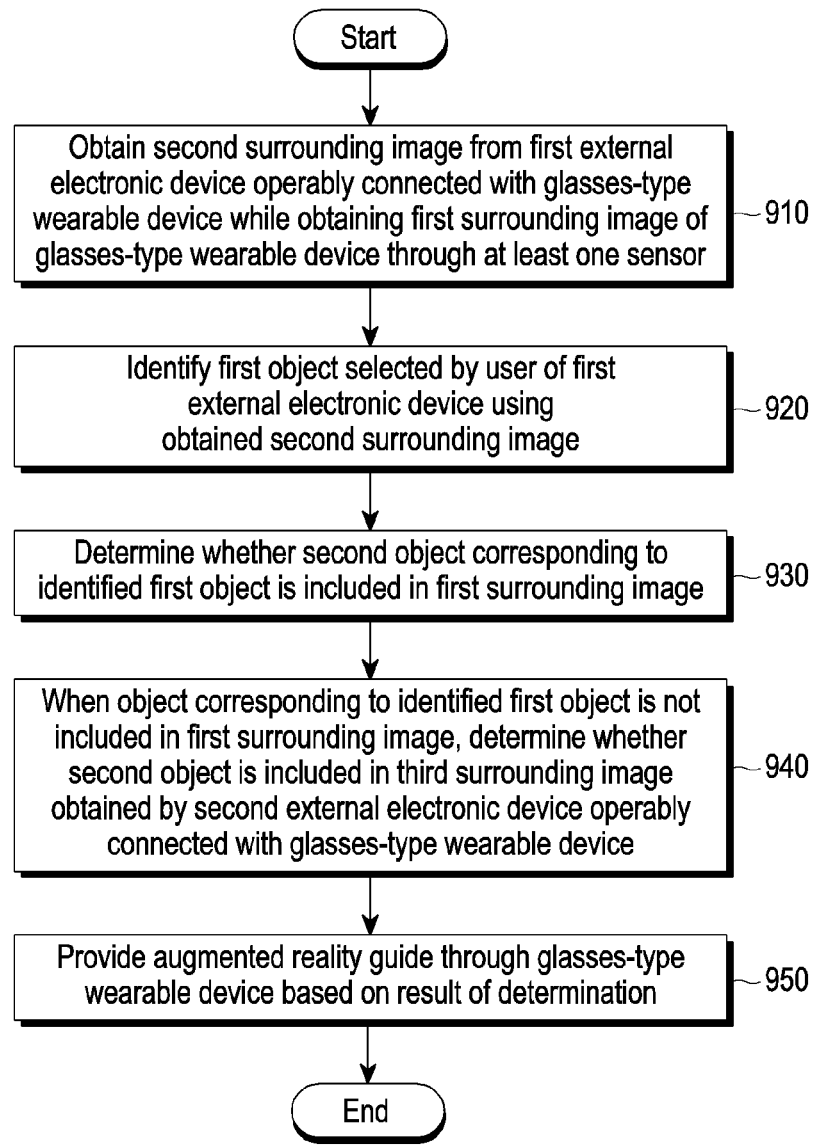
FIG. 9 is an example view illustrating a function or operation of providing a position of an object necessary to perform a task, using an image obtained by a peripheral device connected to a second user's glasses-type wearable device according to an embodiment of the disclosure.

FIG. 9 is an example view illustrating a function or operation of providing the position of an object necessary to perform a task, using an image obtained by a peripheral device connected to a second user's glasses-type wearable device according to an embodiment of the disclosure.

Figure 10:
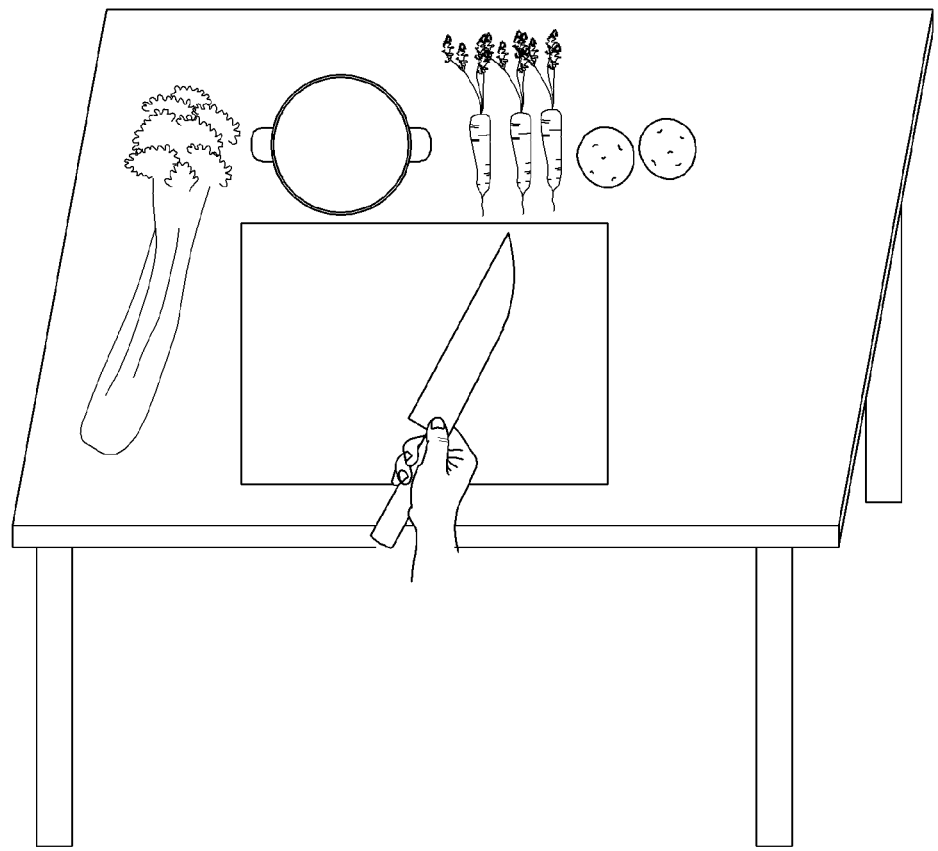
FIG. 10 is an example view illustrating a function or operation of identifying an object selected by a first user by a second user's glasses-type wearable device according to an embodiment of the disclosure.

FIG. 10 is an example view illustrating a function or operation of identifying an object selected by a first user by a second user's glasses-type wearable device according to an embodiment of the disclosure.

Figure 11A:
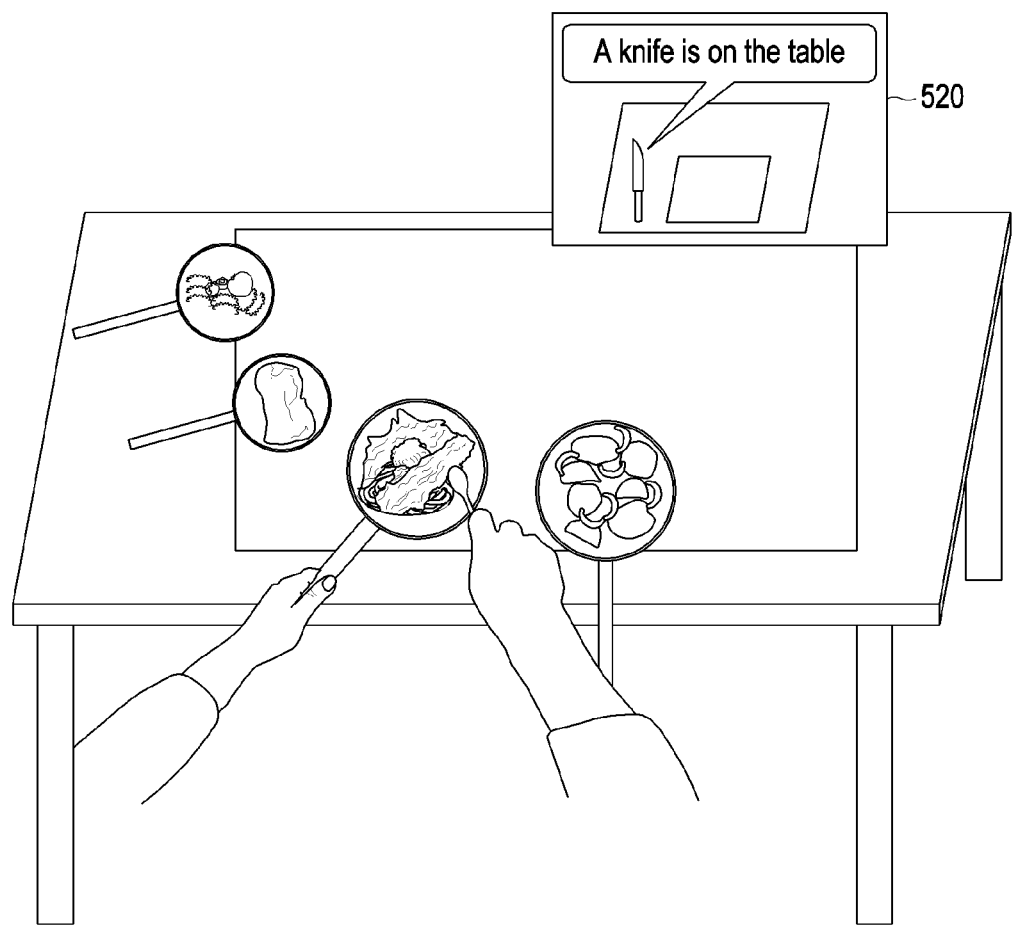
FIG. 11A is an example view illustrating a function or operation of providing a position of an object necessary to perform a task, using an image obtained by a peripheral device connected to a second user's glasses-type wearable device, by the second user's glasses-type wearable device according to an embodiment of the disclosure.

FIG. 11A is an example view illustrating a function or operation of providing the position of an object necessary to perform a task, using an image obtained by a peripheral device connected to a second user's glasses-type wearable device, by the second user's glasses-type wearable device according to an embodiment of the disclosure.

Figure 11B:
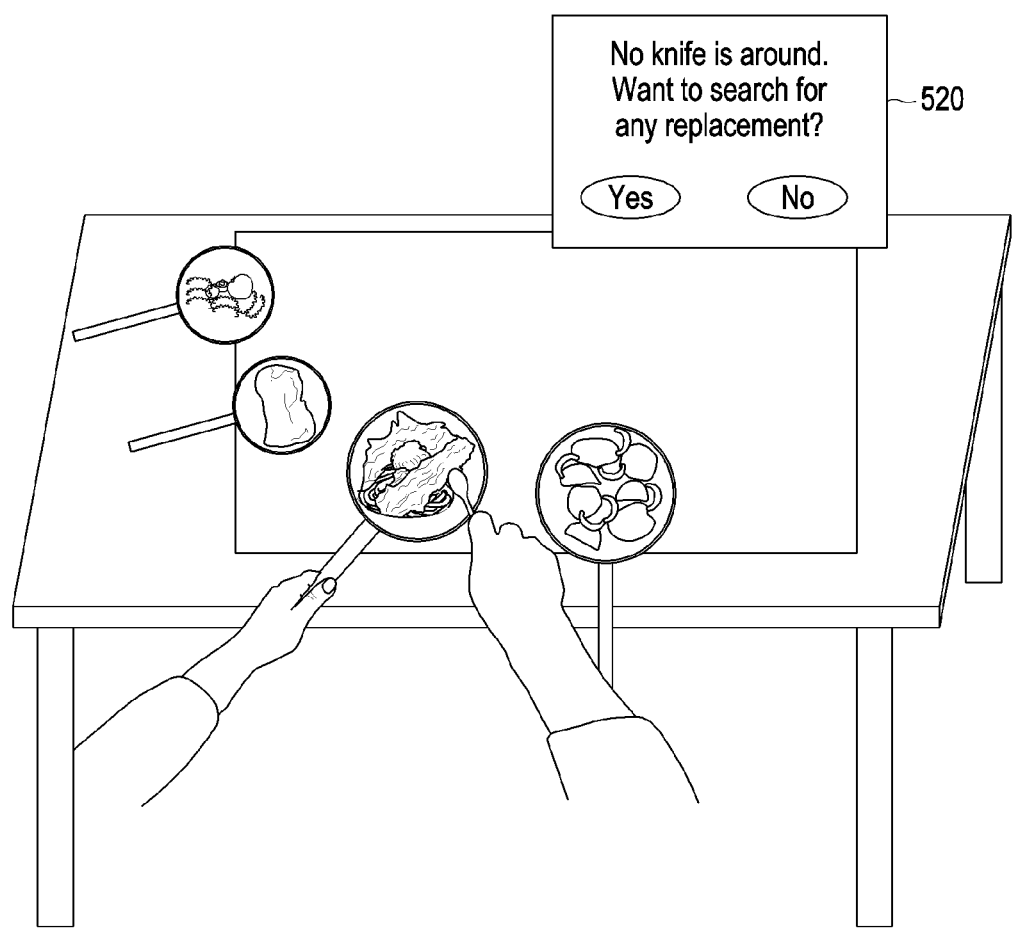
FIG. 11B is an example view illustrating an augmented reality guide represented when an object necessary to perform a task is not present around a second user's glasses-type wearable device and a peripheral device connected to the second user's glasses-type wearable device according to an embodiment of the disclosure.

FIG. 11B is an example view illustrating an augmented reality guide represented when an object necessary to perform a task is not present around a second user's glasses-type wearable device and a peripheral device connected to the second user's glasses-type wearable device according to an embodiment of the disclosure.

Referring to FIG. 9, according to an embodiment of the disclosure, in operation 910, while obtaining a surrounding image through at least one sensor, the second user's glasses-type wearable device 310 may obtain a second surrounding image from a first external electronic device (e.g., the first user's glasses-type wearable device 100) operably connected with the second user's glasses-type wearable device 310.

Referring to FIG. 10, the first user may select a kitchen knife as shown in FIG. 1, and such an image may be obtained and transmitted to the second user's glasses-type wearable device 310. According to an embodiment of the disclosure, the first surrounding image transmitted to the second user's glasses-type wearable device 310 may be represented, as a virtual object, through the second user's glasses-type wearable device 310.

According to an embodiment of the disclosure, in operation 920, the second user's glasses-type wearable device 310 may identify a first object selected by the user of the first external electronic device (e.g., the first user's glasses-type wearable device 100) using the obtained second surrounding image. According to an embodiment of the disclosure, the second user's glasses-type wearable device 310 (e.g., the processor 120) may identify the user's hand and identify whether a specific object is selected based on what object the user's hand has touched and whether the touched object has moved. Further, according to an embodiment of the disclosure, what the specific object is may be identified in a method according to a learning algorithm/artificial intelligence model or a method based on extracting feature points from the specific object and comparing them with a pre-stored reference image.

According to an embodiment of the disclosure, in operation 930, the second user's glasses-type wearable device 310 may determine whether a second object corresponding to the identified first object is included in the first surrounding image. According to an embodiment of the disclosure, the second object may mean an object (e.g., kitchen knife) of substantially the same type as the first object. According to an embodiment of the disclosure, the second user's glasses-type wearable device 310 (e.g., the processor 120) may determine whether the second object corresponding to the identified first object is included in the first surrounding image using various image analysis schemes.

According to an embodiment of the disclosure, in operation 940, when the second object corresponding to the identified first object is not included in the first surrounding image, the second user's glasses-type wearable device 310 may determine whether the second object is included in a third surrounding image obtained by the second external electronic device operably connected with the second user's glasses-type wearable device 310. According to an embodiment of the disclosure, based on object position information transmitted from the second external electronic device operably connected with the second user's glasses-type wearable device 310, the second user's glasses-type wearable device 310 may identify whether the second object is positioned inside or around the second external electronic device. For example, when the second external electronic device is a refrigerator 312, the refrigerator 312 may have information about food stored in the refrigerator 312 and, if the object selected by the first user is spinach, it may transmit information about whether spinach is present in the refrigerator 312 (e.g., object position information) to the second user's glasses-type wearable device 310, rather than transmitting the third surrounding image to the second user's glasses-type wearable device 310. Accordingly, the second user's glasses-type wearable device 310 may identify whether the object selected by the first user is present in the refrigerator 312. According to an embodiment of the disclosure, when the second object corresponding to the identified first object is not included in the first surrounding image, the second user's glasses-type wearable device 310 (e.g., the processor 120) may request the second external electronic device (e.g., the refrigerator 312 operably connected with the second user's glasses-type wearable device 310 to transmit position information about the second object corresponding to the identified first object to identify the position of the second object. Further, according to an embodiment of the disclosure, when the second object corresponding to the identified first object is not included in the first surrounding image, the second user's glasses-type wearable device 310 (e.g., the processor 120) may request the second external electronic device (e.g., the refrigerator 312 or the smartphone 314) operably connected with the second user's glasses-type wearable device 310 to provide an image (e.g., the third surrounding image) obtained by the second external electronic device to identify the position of the second object. For example, when the second external electronic device is the refrigerator 312, at least one image of an image captured for the inside of the refrigerator 312 (e.g., an image obtained by a camera positioned inside the refrigerator) and an image captured for the outside (e.g., an image obtained by a camera positioned outside the refrigerator) may be transmitted to the second user's glasses-type wearable device 310. For example, when the second external electronic device is the smartphone 314, at least one image among images obtained by the front camera and rear camera of the smartphone 314 may be transmitted to the second user's glasses-type wearable device 310. According to an embodiment of the disclosure, an identification request message for identifying whether the second external electronic device is capturing an image may be transmitted before requesting to provide the image (e.g., the third surrounding image) obtained by the second external electronic device. In this case, if a message indicating that the second external electronic device is not capturing an image is received, the second user's glasses-type wearable device 310 according to an embodiment of the disclosure may transmit a message to request to capture an image to the second external electronic device automatically or according to the second user's selection. According to an embodiment of the disclosure, the second user's glasses-type wearable device 310 may sequentially select second external electronic devices to be requested to provide an image depending on the type of the object selected by the first user. In other words, according to an embodiment of the disclosure, the second user's glasses-type wearable device 310 may preferentially select a search device depending on the type of the object which is a target for search. For example, when the object (e.g., the object to be searched for) selected by the first user is a kitchen knife, since the kitchen knife is highly likely to be in the kitchen, an image providing request may be transmitted preferentially to the refrigerator 312 (e.g., the search device) located in the kitchen. Or, when the object selected by the first user is spinach, since spinach, which is food, is highly likely to be in the refrigerator 312, an image providing request may be transmitted preferentially to the refrigerator 312 (e.g., the search device) in the kitchen. According to an embodiment of the disclosure, information about the second external electronic device may be known to the second user's glasses-type wearable device 310, previously or through responding to transmission of a position providing request message to the second external electronic device. According to an embodiment of the disclosure, when the image transmitted from the refrigerator 312 does not include the specific object (e.g., kitchen knife), the second user's glasses-type wearable device 310 may transmit an image transmission request to another second external electronic device. According to an embodiment of the disclosure, the second user's glasses-type wearable device 310 may request the second external electronic device to determine whether there is the specific object. In this case, according to an embodiment of the disclosure, the second user's glasses-type wearable device 310 may transmit information about the specific object to the second external electronic device (e.g., the smartphone 314).

According to an embodiment of the disclosure, in operation 950, the second user's glasses-type wearable device 310 may provide an augmented reality guide through the second user's glasses-type wearable device 310 based on a result of the determination in operation 940. According to an embodiment of the disclosure, when the specific object exists in the image as a result of analysis of the image obtained from the second external electronic device, the second user's glasses-type wearable device 310 may represent position information about the object selected by the first user, as a virtual object.

Referring to FIG. 11A, if the image obtained by the smartphone 314 includes the kitchen knife, an augmented reality guide 520 including a guide message (e.g., "Knife is on the table") may be provided along with the image obtained by the smartphone 314.

However, referring to FIG. 11B, according to an embodiment of the disclosure, when the specific object does not exist in the image as a result of analysis of the image obtained from the second external electronic device, the second user's glasses-type wearable device 310 may provide an augmented reality guide 520 including a guide message indicating that the specific object does not exist. In this case, there may be also provided a selection menu that may be selected by touching a touchpad provided by the glasses-type wearable device 310 or the user's virtual touch.

Figure 12:
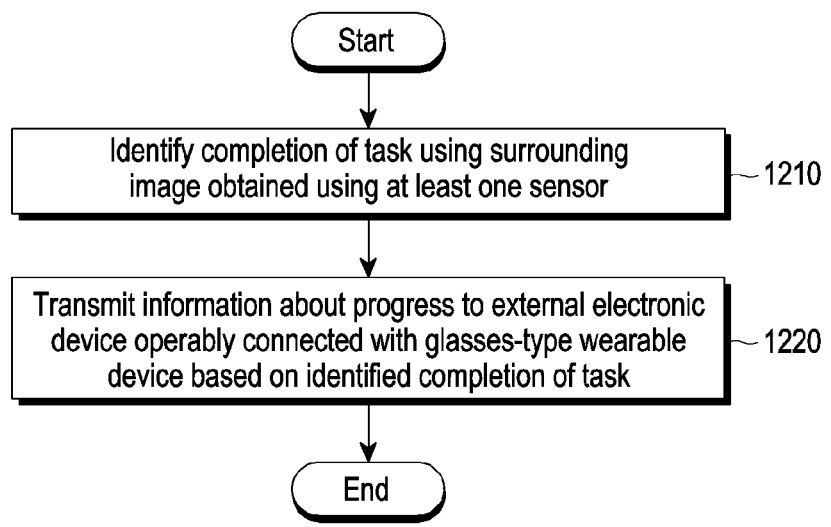
FIG. 12 is an example view illustrating a function or operation of displaying a message indicating that performing a task is complete through another device operably connected to a glasses-type wearable device when performing the task is complete according to an embodiment of the disclosure.

FIG. 12 is an example view illustrating a function or operation of displaying a message indicating that performing a task is complete through another device (e.g., the smartphone 314) operably connected to a glasses-type wearable device 100 or 310 when performing the task is complete according to an embodiment of the disclosure.

Figure 13:
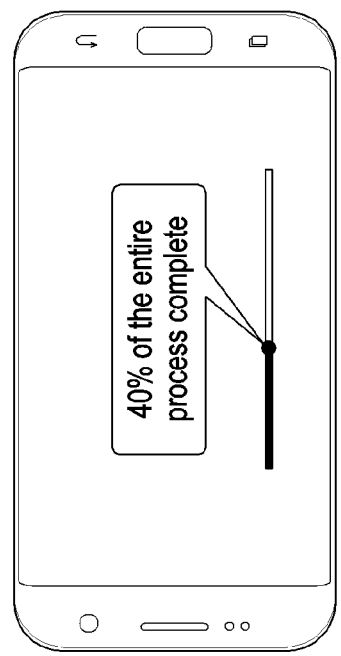
FIG. 13 is an example view illustrating that the function or operation described in connection with FIG. 12 is represented in terms of user experience according to an embodiment of the disclosure.
Figure 13:
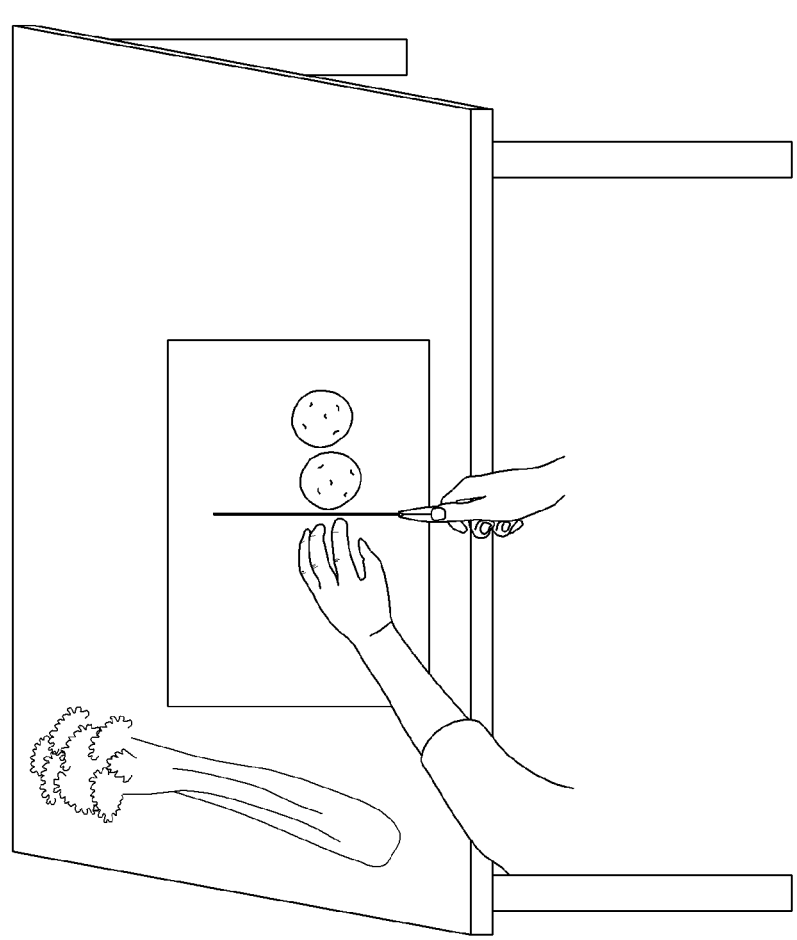

FIG. 13 is an example view illustrating that the function or operation described in connection with FIG. 12 is represented in terms of user experience according to an embodiment of the disclosure.

Referring to FIG. 12, according to an embodiment of the disclosure, in operation 1210, the glasses-type wearable device 100 or 310 may identify the completion of a task using a surrounding image obtained using at least one sensor (e.g., the first camera 111 or the third camera 113). According to an embodiment of the disclosure, the glasses-type wearable device 100 or 310 (e.g., the processor 120) may identify whether the task being currently performed by each user is complete by comparing the reference image stored in the glasses-type wearable device 100 or 310 (e.g., the memory 140) and the surrounding image. For example, if a designated time elapses after correspondence between the reference image of potato slicing and the surrounding image (e.g., when the result of analysis of motion in the image quantitatively falls within an error range) is complete, it may be determined that the task of potato slicing is complete before the designated time elapses. Such a function or operation of identifying the completion of the task may be learned by the artificial intelligence model. Such learning may be performed, e.g., by the glasses-type wearable device 100 itself or through a separate server (e.g., the server 320).

According to an embodiment of the disclosure, in operation 1220, the glasses-type wearable device 100 or 310 may transmit information about the progress to an external electronic device (e.g., the smartphone 314) operably connected with the glasses-type wearable device 100 based on the identified completion of the task. According to an embodiment of the disclosure, the glasses-type wearable device 100 or 310 (e.g., the memory 140) may store a whole process (e.g., a plurality of tasks) for a specific operation. Or, the glasses-type wearable device 100 or 310 may receive the information about the whole process from another electronic device.

Referring to FIG. 13, according to an embodiment of the disclosure, if the task of potato slicing corresponds to 40% of the whole operation (e.g., when the task of potato slicing is the second task among the five tasks), information thereabout may be transmitted to the external electronic device (e.g., the smartphone 314) operably connected with the glasses-type wearable device 100. According to an embodiment of the disclosure, the external electronic device (e.g., the smartphone 314) may display information about the current progress (e.g., "40% of the whole process complete") based on the received information. According to an embodiment of the disclosure, an image captured by an internal camera of the second external electronic device (e.g., the refrigerator 312) connected with the second user's glasses-type wearable device 310 may be transmitted to the first user's glasses-type wearable device 100 to receive a recommendation for a replacement. Further, according to an embodiment of the disclosure, the first user's glasses-type wearable device 100 may be configured to transmit a designated image or information (e.g., time necessary for cooking) to the second external electronic device (e.g., the smartphone 314 or a smart watch) connected with the second user's glasses-type wearable device 310. To that end, according to an embodiment of the disclosure, the first user's glasses-type wearable device 100 may be operably connected with the second external electronic device (e.g., the smartphone 314 or a smart watch) connected with the second user's glasses-type wearable device 310.

Figure 14:
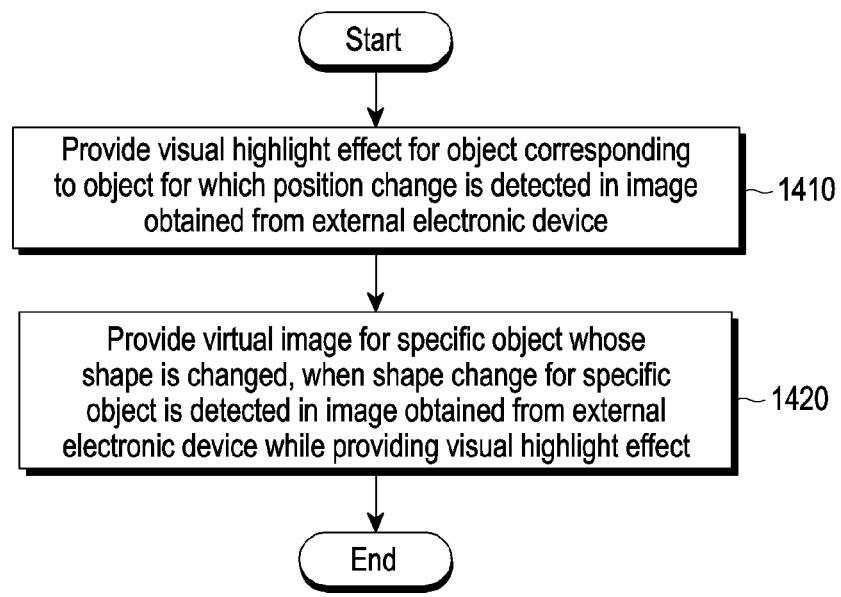
FIG. 14 is an example view illustrating a function or operation of providing an augmented reality guide based on a change in position and form of a specific object while performing a task according to an embodiment of the disclosure.

FIG. 14 is an example view illustrating a function or operation of providing an augmented reality guide based on a change in position and form of a specific object while performing a task according to an embodiment of the disclosure.

FIGS. 15A to 17 are example views illustrating that the function or operation described in connection with FIG. 14 is represented in terms of user experience according to various embodiments of the disclosure.

Referring to FIG. 14, according to an embodiment of the disclosure, in operation 1410, the second user's glasses-type wearable device 310 may provide a visual highlight effect on the object corresponding to the object whose position change is detected in the image obtained from the external electronic device (e.g., the first user's glasses-type wearable device 100).

Figure 15A:
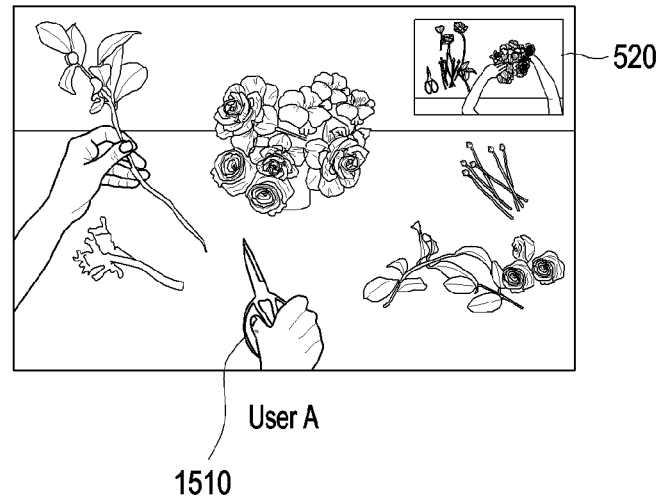
FIGS. 15A, 15B, 15C, 15D, 15E, 16, and 17 are example views illustrating that the function or operation described in connection with FIG. 14 is represented in terms of user experience according to various embodiments of the disclosure.
Figure 15B:
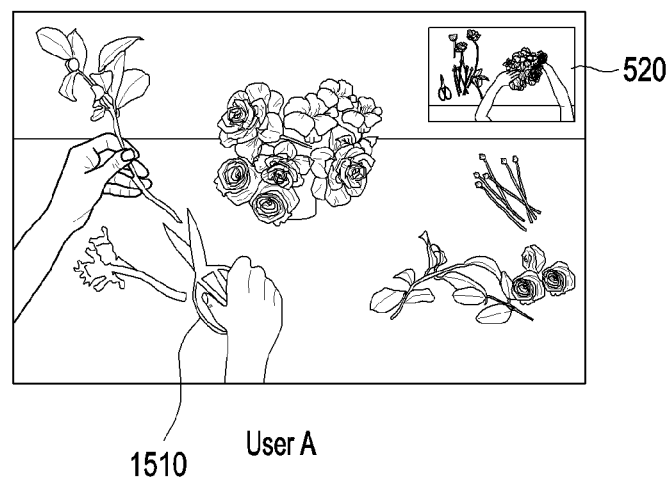

Referring to FIGS. 15A and 15B, they illustrate an example in which the first user cuts a flower with a specific object (e.g., scissors 1510). In this case, an image captured by the second user's glasses-type wearable device 310 may be provided, as an augmented reality guide 520, through the first user's glasses-type wearable device 100.

Figure 15C:
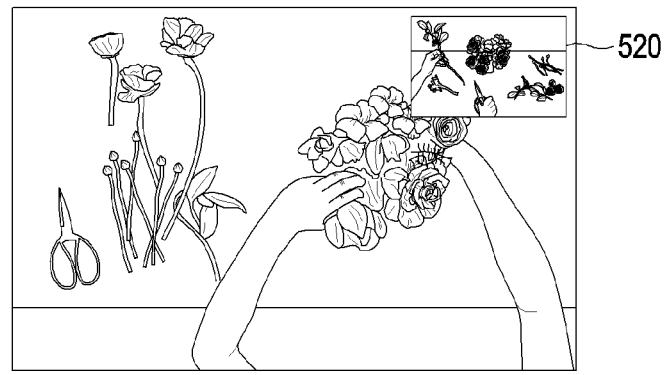
Figure 15D:
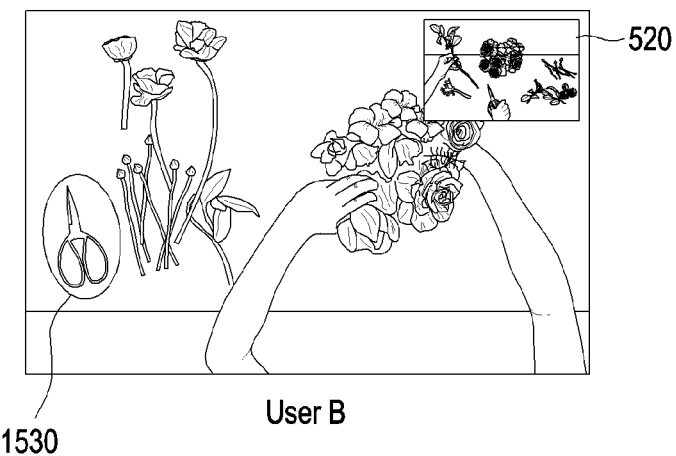

Referring to FIGS. 15C and 15D, an image captured by the first user's glasses-type wearable device 100 may be provided, as the augmented reality guide 520, through the second user's glasses-type wearable device 310. Further, according to an embodiment of the disclosure, a second visual element 1530 may be provided through the second user's glasses-type wearable device 310 while the image captured by the first user's glasses-type wearable device 100 is provided as the augmented reality guide 520. According to an embodiment of the disclosure, the second visual element 1530 may be provided around the object corresponding to the object whose position change is detected from the image obtained from the external electronic device (e.g., the first user's glasses-type wearable device 100).

According to an embodiment of the disclosure, in operation 1420, if a shape change in the specific object is detected from the image obtained from the external electronic device (e.g., the first user's glasses-type wearable device 100) while the visual highlight effect is provided, the second user's glasses-type wearable device 310 may provide a virtual image for the specific object whose shape is changed.

Figure 15E:
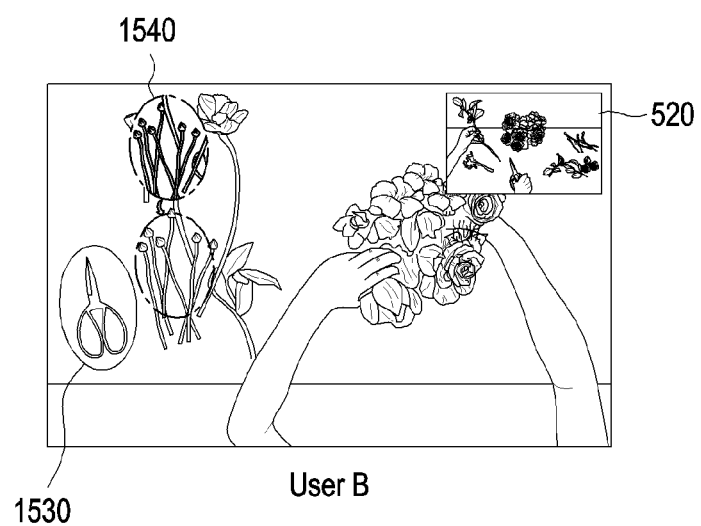

Referring to FIG. 15E, according to an embodiment of the disclosure, the second user's glasses-type wearable device 310 (e.g., the processor 120) may identify the object (e.g., flower) whose shape is changed from the image obtained from the external electronic device (e.g., the first user's glasses-type wearable device 100). In this case, according to an embodiment of the disclosure, the second user's glasses-type wearable device 310 may provide a second virtual image 1540 for the specific object whose shape is changed. According to an embodiment of the disclosure, the second virtual image 1540 may include a virtual image reflecting the shape change.

Figure 16:
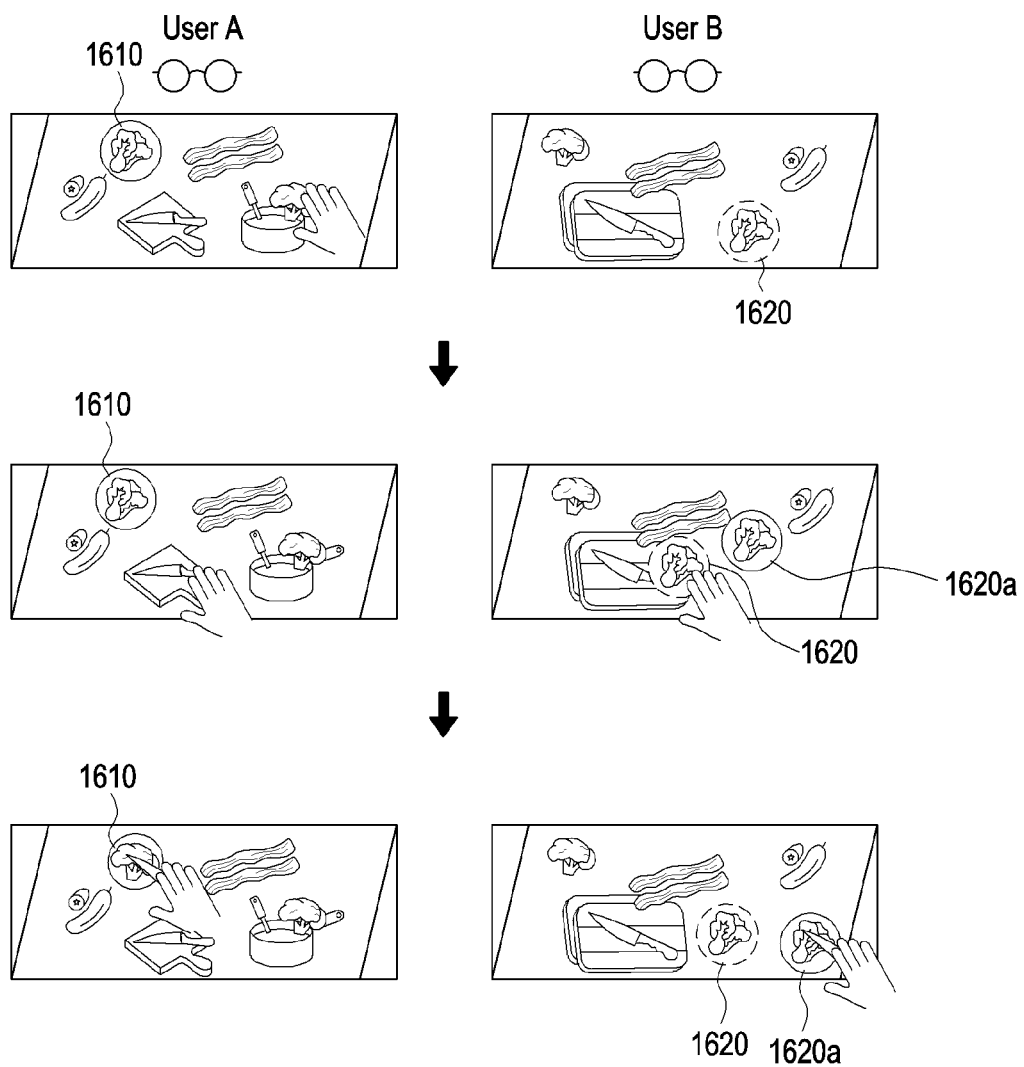

Referring to FIG. 16, according to an embodiment of the disclosure, if the first user selects the first object 1610 (e.g., broccoli), the third object 1620a corresponding to the first object 1610, as a virtual object, may be provided through the second user's glasses-type wearable device 310. The second object 1620 of the disclosure may be substantially the same as the first object 1610. According to an embodiment of the disclosure, if the first user deforms the first object 1610, the third object 1620a may also be deformed and provided.

Figure 17:
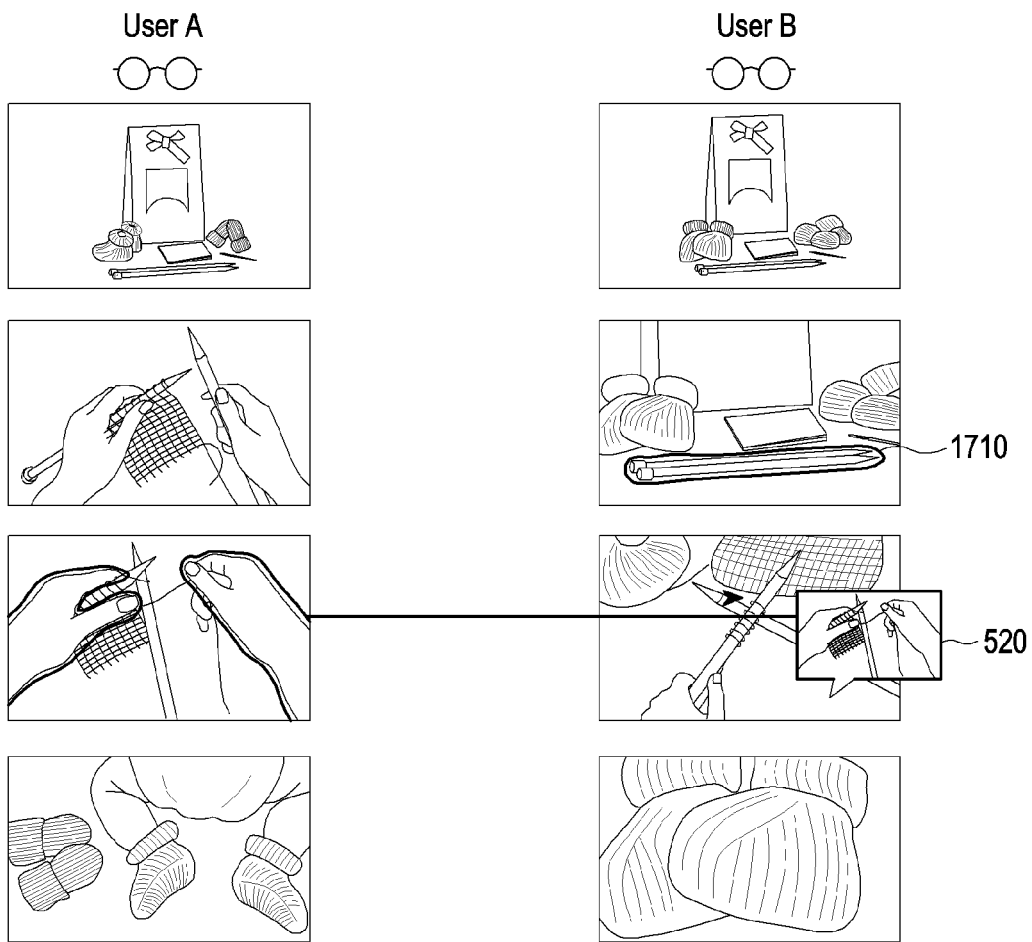

FIG. 17 illustrates an embodiment in which the first user teaches the second user how to knit according to an embodiment of the disclosure.

Referring to FIG. 17, a third visual element 1710 may be provided for a fourth object which has moved, through the second user's glasses-type wearable device 310. Further, an image obtained by the first user's glasses-type wearable device 100 may be provided, as the augmented reality guide 520, through the second user's glasses-type wearable device 310.

Figure 18:
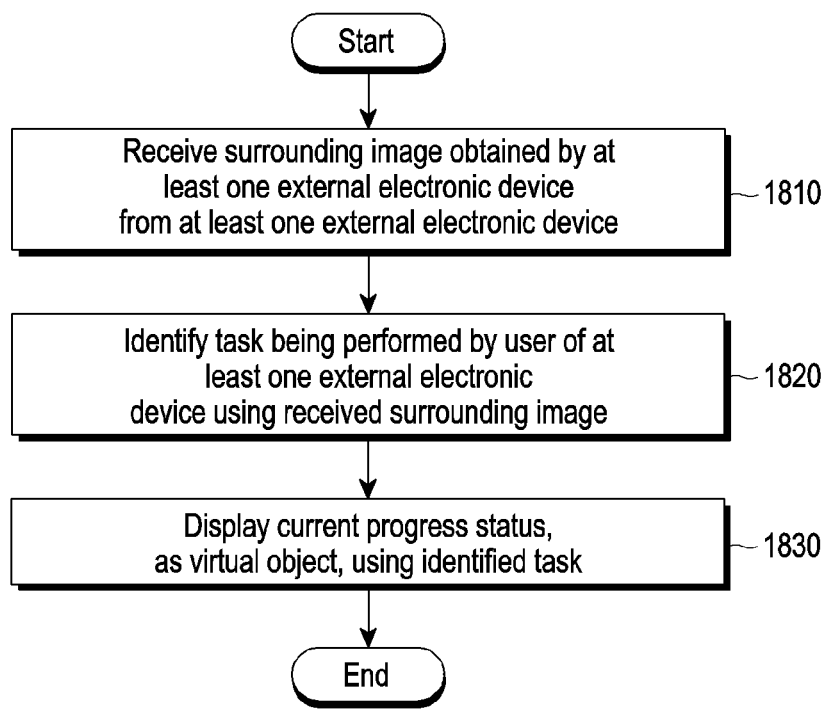
FIG. 18 is an example view illustrating a function or operation of representing an augmented reality guide indicating a task progress status according to an embodiment of the disclosure.

FIG. 18 is an example view illustrating a function or operation of representing an augmented reality guide indicating a task progress status according to an embodiment of the disclosure.

Figure 19A:
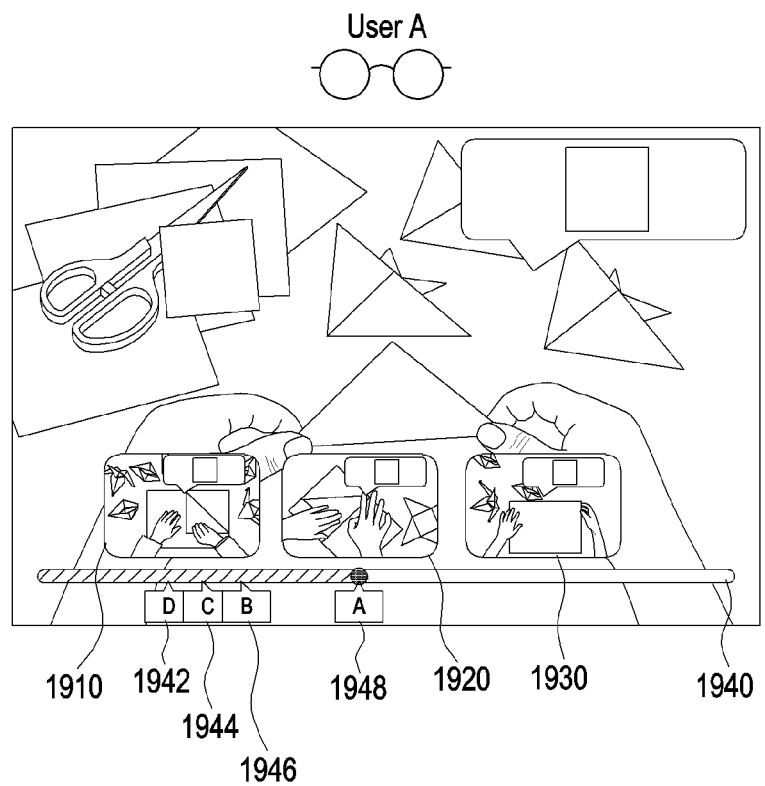
FIGS. 19A and 19B are example views illustrating that the function or operation described in connection with FIG. 18 is represented in terms of user experience according to various embodiments of the disclosure.
Figure 19B:
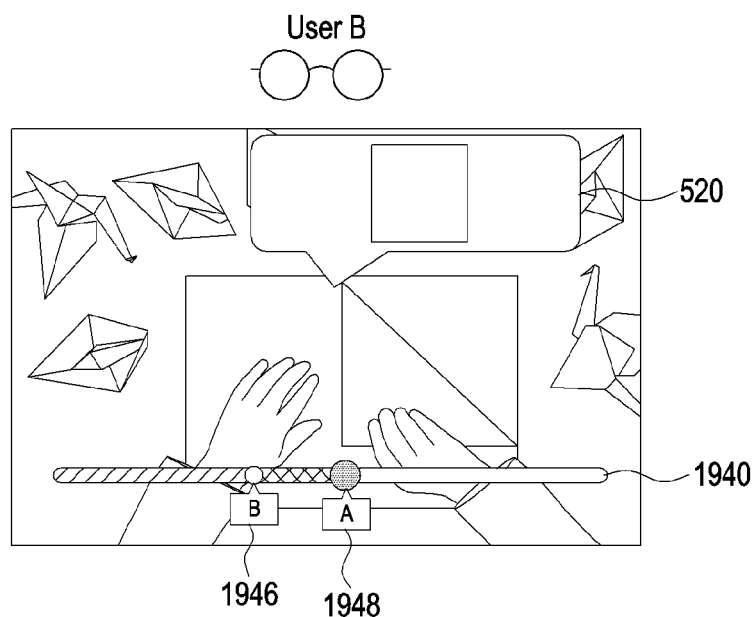

FIGS. 19A and 19B are example views illustrating that the function or operation described in connection with FIG. 18 is represented in terms of user experience according to various embodiments of the disclosure.

Referring to FIG. 18, according to an embodiment of the disclosure, in operation 1810, the glasses-type wearable device 100 or 310 may receive a surrounding image obtained by at least one external electronic device from at least one external electronic device (e.g., the first user's glasses-type wearable device 100 or the second user's glasses-type wearable device 310).

According to an embodiment of the disclosure, in operation 1820, the glasses-type wearable device 100 or 310 may identify the task (e.g., progress) being performed by the user of the at least one external electronic device (e.g., the first user's glasses-type wearable device 100 or the second user's glasses-type wearable device 310) using the received surrounding image. According to an embodiment of the disclosure, the glasses-type wearable device 100 or 310 may identify the task (e.g., progress) being performed by the user of at least one external electronic device (e.g., the first user's glasses-type wearable device 100 or the second user's glasses-type wearable device 310) using various methods described above in the disclosure. For example, the task (e.g., progress) being performed may be identified in such a manner as to determine the current progress for the user by comparing the image of performing the operation stored in the glasses-type wearable device 310 (e.g., the memory 140) and the image of the user's current performing.

According to an embodiment of the disclosure, in operation 1830, the glasses-type wearable device 100 or 310 may display the current progress, as a virtual object, using the identified task.

Referring to FIG. 19A, according to an embodiment of the disclosure, the first user's glasses-type wearable device 100 may provide a status bar 1940 including an indicator (e.g., a first indicator 1942, a second indicator 1944, a third indicator 1946, or a fourth indicator 1948) indicating the current progress of the task for each user, as a virtual object. Further, according to an embodiment of the disclosure, the first user's glasses-type wearable device 100 may provide an image (e.g., a first surrounding image 1910, a second surrounding image 1920, or a third surrounding image 1930) obtained from at least one external electronic device, as a virtual object. According to an embodiment of the disclosure, a guide image (e.g., a pilot image stored in the memory 140) may be played as a virtual object through a virtual touch input to the status bar 1940.

Referring to FIG. 19B, according to an embodiment of the disclosure, the second glasses-type wearable device 310 may provide an augmented reality guide 520 (e.g., a pilot image). According to an embodiment of the disclosure, the second glasses-type wearable device 310 may provide a status bar 1940 including at least one indicator (e.g., the third indicator 1946 and the fourth indicator 1948), as a virtual object.

Figure 20:
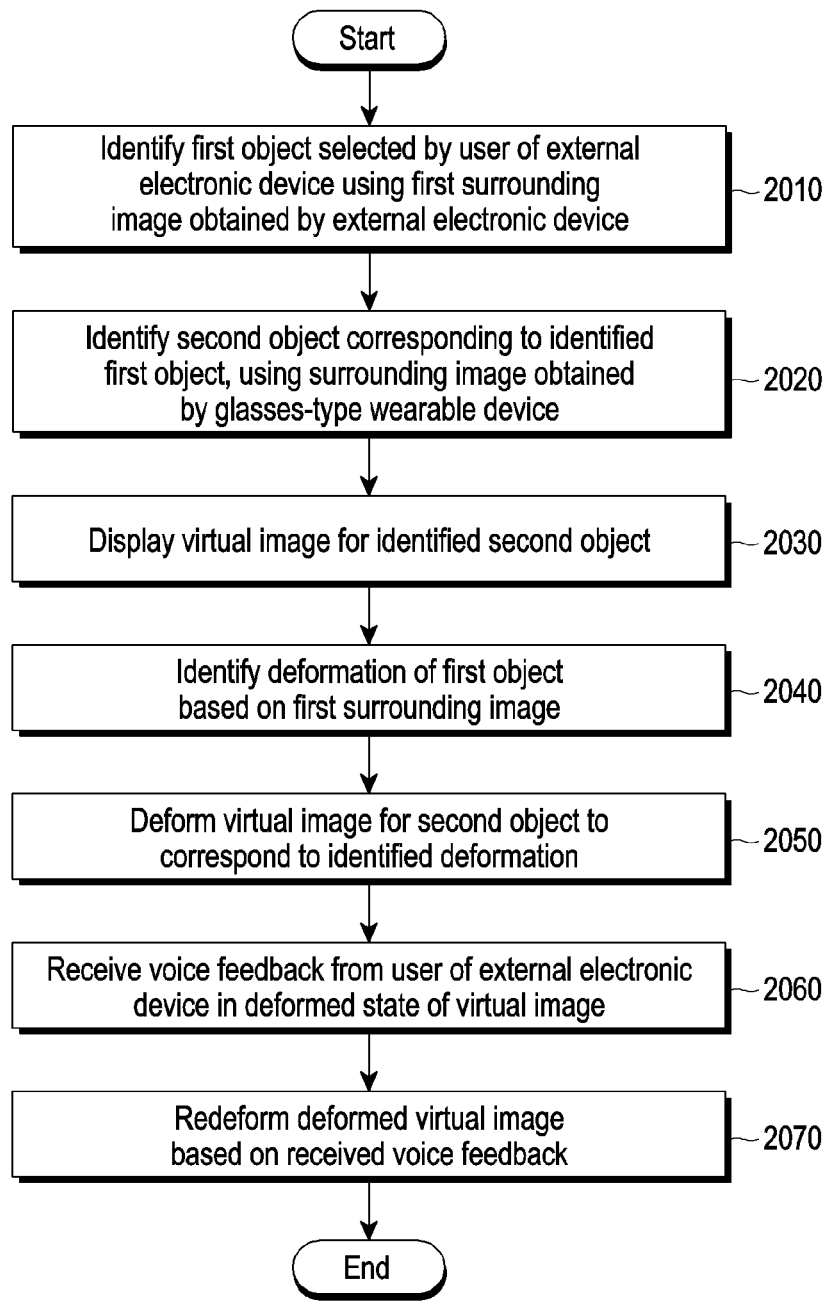
FIG. 20 is an example view illustrating a function or operation of controlling an augmented reality guide represented through a second user's glasses-type wearable device based on a first user's voice feedback according to an embodiment of the disclosure.

FIG. 20 is an example view illustrating a function or operation of controlling an augmented reality guide represented through a second user's glasses-type wearable device based on a first user's voice feedback according to an embodiment of the disclosure.

Figure 21:
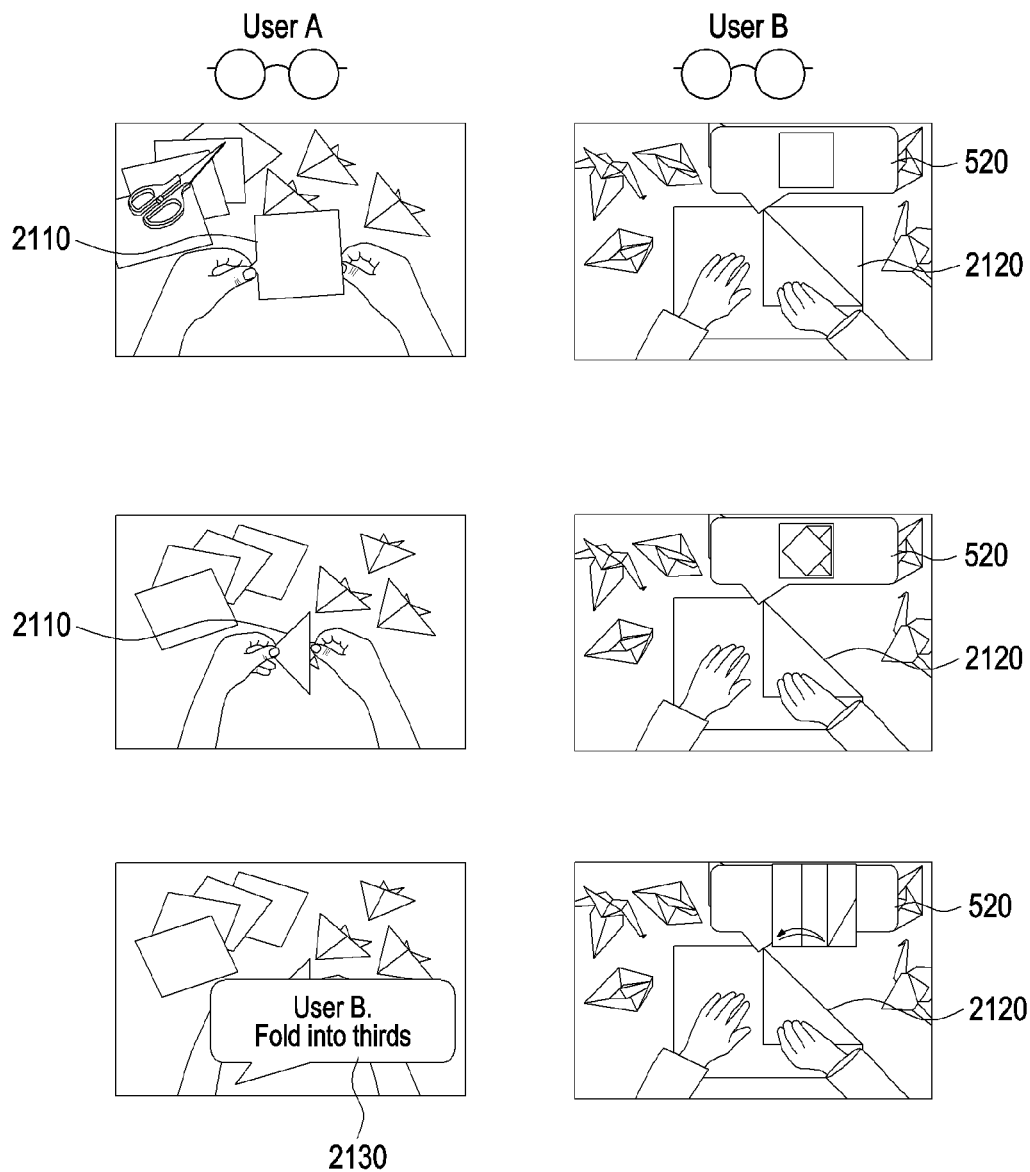
FIG. 21 is an example view illustrating that the function or operation described in connection with FIG. 20 is represented in terms of user experience according to an embodiment of the disclosure.

FIG. 21 is an example view illustrating that the function or operation described in connection with FIG. 20 is represented in terms of user experience according to an embodiment of the disclosure.

Referring to FIG. 20, according to an embodiment of the disclosure, in operation 2010, the second user's glasses-type wearable device 310 may identify a first object (e.g., the fourth object 2110) selected by the user of an external electronic device using a first surrounding image obtained by the external electronic device (e.g., the first user's glasses-type wearable device 100). According to an embodiment of the disclosure, the second user's glasses-type wearable device 310 may identify the first object (e.g., the fourth object 2110) selected by the user of the external electronic device using various methods described in the disclosure.

According to an embodiment of the disclosure, in operation 2020, the second user's glasses-type wearable device 310 may identify a second object (e.g., the fifth object 2120) corresponding to the identified first object, using a second surrounding image obtained by the glasses-type wearable device (e.g., the second user's glasses-type wearable device 310). According to an embodiment of the disclosure, in operation 2030, the second user's glasses-type wearable device 310 may display a virtual image for the identified second object (e.g., the fifth object 2120).

Referring to FIG. 21, according to an embodiment of the disclosure, the second user's glasses-type wearable device 310 may provide an augmented reality guide 520 for the identified second object (e.g., the fifth object 2120).

According to an embodiment of the disclosure, in operation 2040, the second user's glasses-type wearable device 310 may identify a deformation of the first object (e.g., the fourth object 2110) based on the first surrounding image. According to an embodiment of the disclosure, in operation 2050, the second user's glasses-type wearable device 310 may deform the virtual image for the second object (e.g., the fifth object 2120) to correspond to the identified deformation. For example, as shown in FIG. 21, according to an embodiment of the disclosure, if the first user's folding of the fourth object 2110 is identified, the second user's glasses-type wearable device 310 may deform the virtual object provided as the augmented reality guide 520 to correspond to the folding of the fourth object 2110 and provide it.

According to an embodiment of the disclosure, in operation 2060, in the deformed state of the virtual image, the second user's glasses-type wearable device 310 may receive a voice feedback from the user of the external electronic device (e.g., the first user's glasses-type wearable device 100). According to an embodiment of the disclosure, in operation 2070, the second user's glasses-type wearable device 310 may redeform the deformed virtual image based on the received voice feedback. For example, referring to FIG. 21, according to an embodiment of the disclosure, the second user's glasses-type wearable device 310 may receive the voice feedback 2130, "User B. Please fold into thirds." According to an embodiment of the disclosure, the second user's glasses-type wearable device 310 may analyze the voice feedback and generate and provide the augmented reality guide 520, or it may receive information about the augmented reality guide 520 from an external electronic device (e.g., the server 320 or the first user's glasses-type wearable device 100) and provide it, or it may select a guide corresponding to the voice feedback from among guides stored in the second user's glasses-type wearable device 310 and provide it. According to an embodiment of the disclosure, the second user's glasses-type wearable device 310 may provide the augmented reality guide 520 corresponding to the user's voice feedback as shown in FIG. 21.

Figure 22:
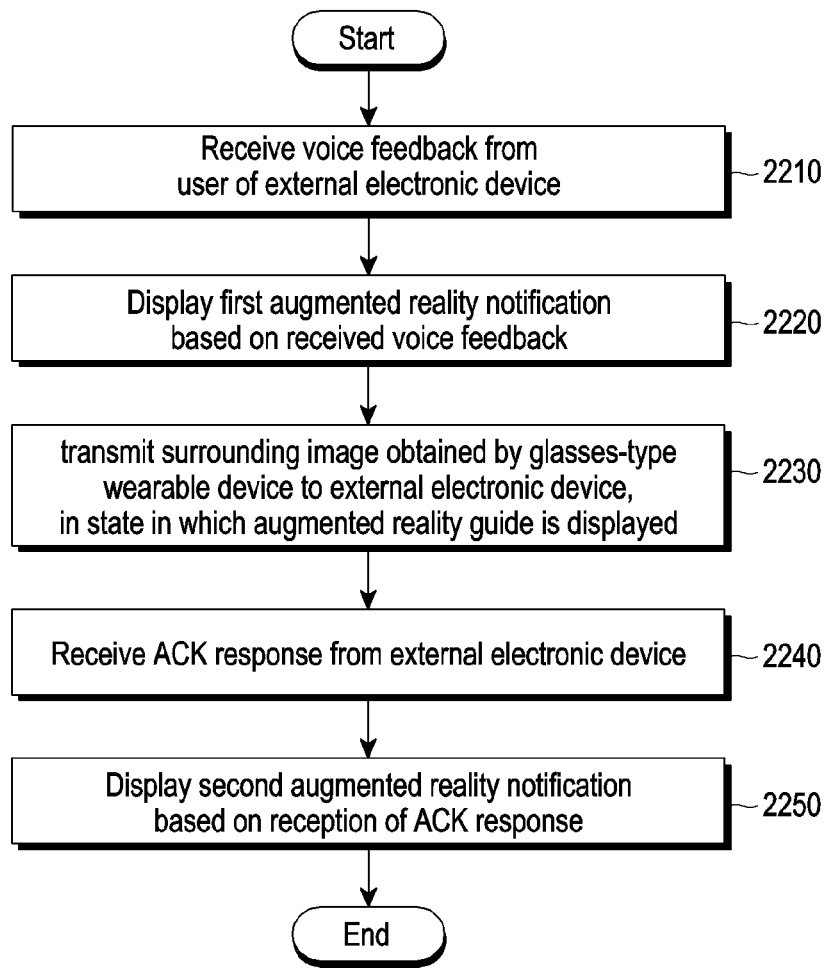
FIG. 22 is an example view illustrating a function or operation of displaying a first augmented reality notification according to a first user's voice feedback and displaying a second augmented reality notification according to a first user's acknowledgment response according to an embodiment of the disclosure.

FIG. 22 is an example view illustrating a function or operation of displaying a first augmented reality notification according to a first user's voice feedback and displaying a second augmented reality notification according to a first user's acknowledgment response according to an embodiment of the disclosure. FIG. 22 is an example view illustrating that the function or operation described in connection with FIG. 21 is represented in terms of user experience.

Referring to FIG. 22, according to an embodiment, in operation 2210, the second user's glasses-type wearable device 310 may receive a voice feedback from an external electronic device (e.g., the first user's glasses-type wearable device 100). According to an embodiment of the disclosure, in operation 2220, the second user's glasses-type wearable device 310 may display a first augmented reality notification based on the received voice feedback.

Figure 23:
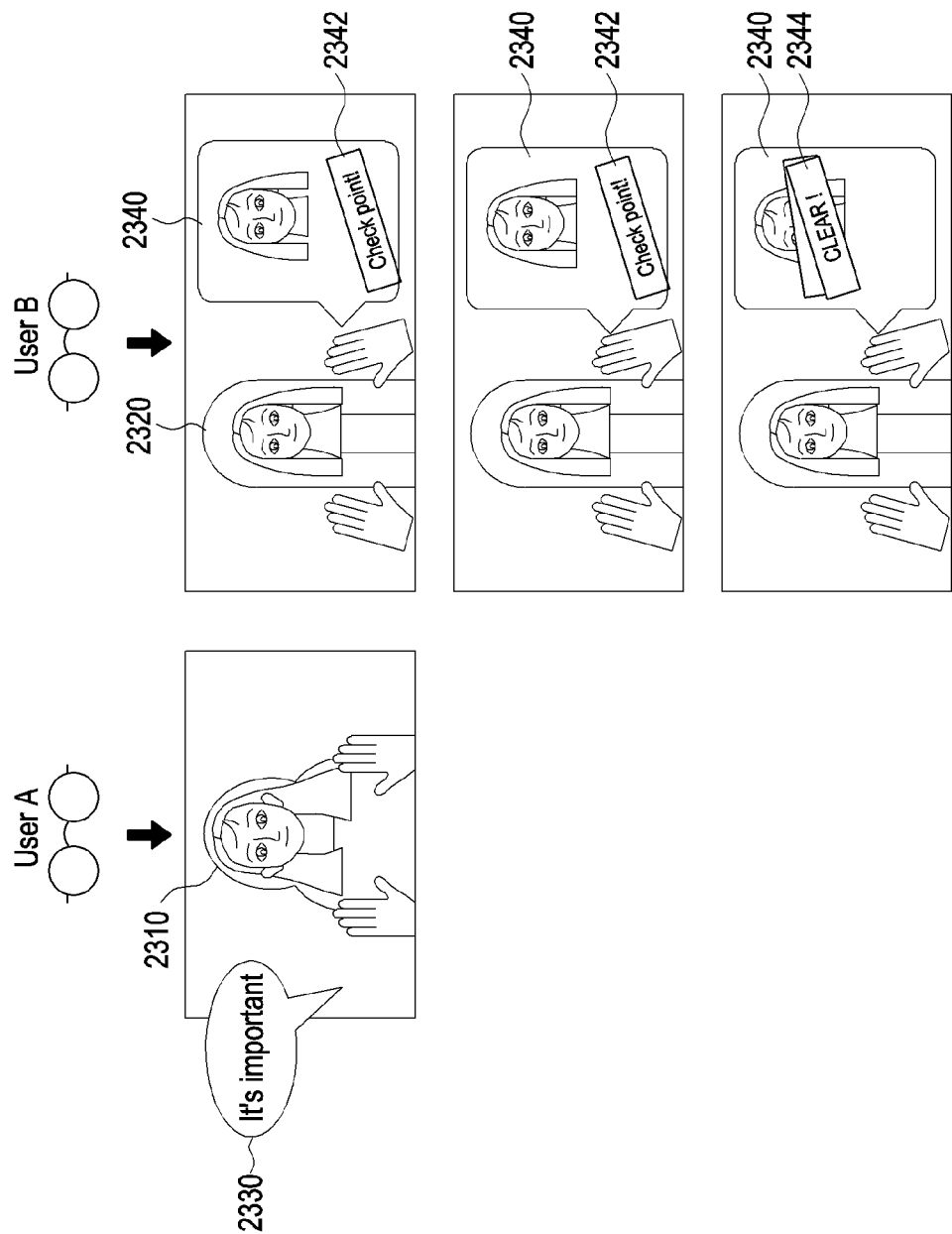
FIG. 23 is an example view illustrating that the function or operation described in connection with FIG. 22 is represented in terms of user experience according to an embodiment of the disclosure.

FIG. 23 is an example view illustrating that the function or operation described in connection with FIG. 22 is represented in terms of user experience according to an embodiment of the disclosure.

Referring to FIG. 23, according to an embodiment of the disclosure, if receiving a voice feedback (e.g., "It's important") as voice data from the first user, the second user's glasses-type wearable device 310 (e.g., the processor 120) may analyze the meaning of the voice feedback. According to an embodiment of the disclosure, if the meaning of the voice feedback is a meaning indicating importance or if the voice feedback itself corresponds to predesignated voice data, the second user's glasses-type wearable device 310 (e.g., the processor 120) according to an embodiment of the disclosure may provide the first augmented reality notification 2342 around the virtual object 2340 for a seventh object 2320 corresponding to the sixth object 2310.

According to an embodiment of the disclosure, in operation 2230, in the state in which the augmented reality notification is displayed, the second user's glasses-type wearable device 310 may transmit a surrounding image obtained by the glasses-type wearable device (e.g., the second user's glasses-type wearable device 310) to an external electronic device (e.g., the first user's glasses-type wearable device 100). According to an embodiment, in operation 2240, the second user's glasses-type wearable device 310 may receive an acknowledgment response from an external electronic device (e.g., the first user's glasses-type wearable device 100). According to an embodiment of the disclosure, in operation 2250, the second user's glasses-type wearable device 310 may display a second augmented reality notification based on reception of the acknowledgment response. Referring to FIG. 23, according to an embodiment of the disclosure, the second user's glasses-type wearable device 310 may transmit the surrounding image obtained by the glasses-type wearable device (e.g., the second user's glasses-type wearable device 310) to the external electronic device (e.g., the first user's glasses-type wearable device 100) to receive the first user's identification. According to an embodiment of the disclosure, if receiving an acknowledgment response from the first user's glasses-type wearable device 100, the second user's glasses-type wearable device 310 may provide a second augmented reality notification 2344 indicating that it has been identified by the first user.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., the memory 140) that is readable by a machine (e.g., the glasses-type wearable device 100). For example, a processor (e.g., the processor 120) of the machine (e.g., the glasses-type wearable device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A glasses-type wearable device comprising:
a communication circuit;
at least one camera;
at least one processor, and
memory, wherein the memory stores instructions that, when executed by the at least one processor, cause the glasses-type wearable device to:
receive a second surrounding image of an external electronic device operably connected with the glasses-type wearable device, obtained by the external electronic device through the communication circuit while obtaining a first surrounding image of the glasses-type wearable device using the at least one camera,
identify a first task being performed by a user of the glasses-type wearable device using the first surrounding image and a second task being performed by a user of the external electronic device using the second surrounding image,
identify a difference between a current progress status of the first task and a current progress status of the second task, and
control the communication circuit to provide an augmented reality (AR) guide corresponding to the second task to the external electronic device, based on the identified difference.

2. The glasses-type wearable device of claim 1,
wherein the memory is configured to store information about an operation comprising the first task and the second task, and
wherein the operation is divided into a plurality of tasks and stored in the memory.

3. The glasses-type wearable device of claim 1, further comprising a display,
wherein the instructions, when executed by the processor, cause the glasses-type wearable device to control the display to represent an image for the second task, as a virtual object, through the glasses-type wearable device.

4. The glasses-type wearable device of claim 1, wherein the instructions that cause the glasses-type wearable device to control the communication circuit to transmit a request for transmitting information about the AR guide to a server storing the information about the AR guide to allow the information about the AR guide to be transmitted from the server to the external electronic device.

5. The glasses-type wearable device of claim 1, wherein the AR guide comprises a pilot image for the second task.

6. The glasses-type wearable device of claim 5, wherein the pilot image is provided to the external electronic device differently depending on a task performing level corresponding to the external electronic device.

7. The glasses-type wearable device of claim 6, wherein the instructions that cause the glasses-type wearable device to receive information about the task performing level corresponding to the external electronic device from the external electronic device through the communication circuit.

8. A method comprising:
receiving a second surrounding image of an external electronic device operably connected with a glasses-type wearable device, obtained by the external electronic device, from the external electronic device through a communication circuit of the glasses-type wearable device while obtaining a first surrounding image of the glasses-type wearable device using at least one camera of the glasses-type wearable device;
identifying a first task being performed by a user of the glasses-type wearable device using the first surrounding image and a second task being performed by a user of the external electronic device using the second surrounding image;
identifying a difference between a current progress status of the first task and a current progress status of the second task; and
controlling the communication circuit to provide an augmented reality (AR) guide corresponding to the second task to the external electronic device, based on the identified difference.

9. The method of claim 8,
storing, in memory of the glasses-type wearable device, information about an operation comprising the first task and the second task, and
wherein the operation is divided into a plurality of tasks and stored in the memory.

10. The method of claim 8, further comprising:
controlling a display to of the glasses-type wearable device represent an image for the second task, as a virtual object, through the glasses-type wearable device.

11. The method of claim 8, further comprising controlling the communication circuit to transmit a request for transmitting information about the AR guide to a server storing the information about the AR guide to allow the information about the AR guide to be transmitted from the server to the external electronic device.

12. The method of claim 8, wherein the AR guide comprises a pilot image for the second task.

13. The method of claim 12, wherein the pilot image is provided to the external electronic device differently depending on a task performing level corresponding to the external electronic device.

14. The method of claim 13, further comprising receiving information about the task performing level corresponding to the external electronic device from the external electronic device through the communication circuit.

15. The method of claim 14, wherein the task performing level is one of beginner, intermediate or advanced.

16. The method of claim 14, wherein the pilot image is displayed corresponding to a next task without performing a current task according to the task performing level of a task corresponding to the external electronic device.

17. The method of claim 14, further comprising displaying a status bar comprising an indicator of each task in a sequence of tasks being performed by the user of the glasses-type wearable device and the user of the external electronic device.

18. A computer-readable non-volatile recording medium storing instructions configured to perform one or more operations by a processor, the one or more operations comprising:
  receiving, through a communication circuit of a glasses-type wearable device, a second surrounding image of an external electronic device operably connected with the glasses-type wearable device, obtained by the external electronic device, from the external electronic device while obtaining a first surrounding image of the glasses-type wearable device using at least one camera of the glasses-type wearable device;
  identifying a first task being performed by a user of the glasses-type wearable device using the first surrounding image and a second task being performed by a user of the external electronic device using the second surrounding image;
  identifying a difference between a current progress status of the first task and a current progress status of the second task; and
  controlling the communication circuit to provide an augmented reality (AR) guide corresponding to the second task to the external electronic device, based on the identified difference.

* * * * *